US006885653B2

(12) United States Patent
Choi et al.

(10) Patent No.: US 6,885,653 B2
(45) Date of Patent: Apr. 26, 2005

(54) APPARATUS AND METHOD FOR ALLOCATING CHANNEL USING OVSF CODE FOR UPLINK SYNCHRONOUS TRANSMISSION SCHEME IN A W-CDMA COMMUNICATION SYSTEM

(75) Inventors: Sung-Ho Choi, Songnam-shi (KR); Chang-Soo Park, Seoul (KR); Jae-Yoel Kim, Kunpo-shi (KR); Seong-Ill Park, Kunpo-shi (KR); Ki-Ho Jung, Siheung-shi (KR); Ho-Kyu Choi, Seoul (KR); Hyun-Woo Lee, Suwon-shi (KR); Yong-Jun Kwak, Yongin-shi (KR); Kook-Heui Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 722 days.

(21) Appl. No.: 09/764,804

(22) Filed: Jan. 17, 2001

(65) Prior Publication Data

US 2002/0018457 A1 Feb. 14, 2002

(30) Foreign Application Priority Data

| Jan. 17, 2000 | (KR) | 2000-2076 |
| Jan. 18, 2000 | (KR) | 2000-2161 |
| Jan. 19, 2000 | (KR) | 2000-2503 |
| Jun. 24, 2000 | (KR) | 2000-35173 |
| Jun. 29, 2000 | (KR) | 2000-37827 |
| Jun. 30, 2000 | (KR) | 2000-38095 |

(51) Int. Cl.[7] .................................. H04E 7/216
(52) U.S. Cl. ........................ 370/342; 375/141
(58) Field of Search ............................. 370/342, 248, 370/208; 375/141, 441; 355/141, 441

(56) References Cited

U.S. PATENT DOCUMENTS 5,751,761 A    5/1998   Gilhousen
6,009,091 A *  12/1999  Stewart et al. .............. 370/342
6,526,065 B1 * 2/2003   Cheng ........................ 370/441
6,532,250 B1 * 3/2003   Palenius et al. ............ 375/141

FOREIGN PATENT DOCUMENTS

WO        WO 99/03224        1/1999

OTHER PUBLICATIONS

T. Minn and K.Y. Siu, "Dyanmic Assignment of Orthogonal Variable Spreading Factor Codes in W–CDMA", IEEE Journal on SAC, pp. 1429–1440, Aug. 2000.

(Continued)

Primary Examiner—Salvatore Cangialosi
(74) Attorney, Agent, or Firm—Dilworth & Barrese LLP

(57) ABSTRACT

Disclosed is a channel allocation method in a CDMA communication system. The method comprises receiving from a UTRAN one SF node $C_{SF,k}$ out of $2^{m-1}$ SF nodes (where m is an integer larger than 3) arranged in the form of a tree having a mother node and child nodes; searching a group including the received SF node $C_{SF,k}$ in accordance with Formula (1) below; spreading a signal on a dedicated physical data channel (DPDCH) with an OVSF code corresponding to a selected one of the received SF node and its child nodes in the searched group; and spreading a signal on a dedicated physical control channel (DPCCH) with an OVSF code corresponding to an SF node determined by Formula (2) below based on the received SF node.

$$\text{For } SF \leq \frac{2^{m-1}}{4}, (P_1 \cdot SF, P_1 \cdot k) = \left(\frac{2^{m-1}}{4}, n\right) \quad \text{Formula (1)}$$

$$\text{For } SF > \frac{2^{m-1}}{4}, \left(P_2 \cdot \frac{2^{m-1}}{4}, P_2 \cdot n\right) = (SF, k)$$

where, $P_1 = \frac{2^{m-1}}{4 \cdot SF}$ and $P_2 = \frac{4 \cdot SF}{2^{m-1}}$.

$$F\left(C_{\frac{2^{m-1}}{4} \cdot k}\right) = C_{2^{m-1}, 2^{m-1}-k-1} \ (k = 0, 1, \ldots) \quad \text{Formula (2)}$$

$$F\left(C_{\frac{2^{m-1}}{4} \cdot k}\right) = C_{2^{m-1}, 2^{m-1}-(k-32)} \ (k = 0, 1, \ldots).$$

14 Claims, 7 Drawing Sheets

OTHER PUBLICATIONS

R.G. Cheng and P. Lin, "OVSF Code Channel Assignment for IMT–2000", IEEE VTC–2000, pp. 2188–2192, May 15–18, 2000.

K. Okawa and F. Adachi, "Orthogonal Multi–Spreading Factor Forward Link for Coherent DS–CDMA Mobile Radio", IEEE $6^{th}$ ICUPC, pp. 618–622, Oct. 12–16, 1997.

Samsung Electronics & SK Telecom, OVSF Code Allocation Rule for Uplink Synchronous Transmission Scheme (USTS), TSG–RAN Working Group 1, Meeting #14, Oulu, Finland, Jul. 4–Jul. 7, 2000, TSGR1#14(00)0873.

Samsung Electronics & SK Telecom, OVSF Code Allocation Rule for Uplink Synchronous Transmission Scheme (USTS) (rev. 1), TSG–RAN Working Group 1, Meeting #1, Oulu, Finland, Jul. 4–Jul. 7, 2000, TSGR1#14(00)0905.

Samsung Electronics & SK Telecom, OVSF Code Allocation Rule for USTS (Uplink Synchronous Transmission Scheme), TSG–RAN WG1 #15, Berlin, Germany, Aug. 22–Aug. 25, 2000, TSGR1#15(00)1160.

$3^{rd}$ Generation Partnership Project; Technical Specification Group Radio Access Network; Spreading and Modulation (FDD) (3G TS 25.213 version 3.1.0), Dec. 1999.

* cited by examiner

SF=1  SF=2  SF=4  SF=8  SF=16  SF=32   SF=64

APPARATUS AND METHOD FOR ALLOCATING CHANNEL USING OVSF CODE FOR UPLINK SYNCHRONOUS TRANSMISSION SCHEME IN A W-CDMA COMMUNICATION SYSTEM

PRIORITY

This application claims priority to application entitled "Apparatus and Method for Allocating OVSF Codes in W-CDMA Communication System" filed in the Korean Industrial Property Office on Jan. 17, 2000 assigned Serial No. 2000-2076; an appplication entitled "Apparatus and Method for Efficiently Allocating Given Radio Resource in CDMA Communication System" filed in the Korean Industrial Property Office on Jan. 18, 2000 and assigned Serial No. 2000-2161; an application entitled "Appatatus and Method for Efficiently Allocating Given Radio Resource in a CDMA Communication System" filed in the Korean Industrial Property Office on Jan 19, 2000 and assigned Serial No. 2000-2503; an application entitled "Appaaratus and Method for Allocating OVSF Codes for Uplink Synchronous Transmission Scheme in a W-CDMA Communication System" filed in the Korean Industrial Property Office on Jun. 24, 2000 and assigned Serial No. 2000-35173; an application entitled "Apparatus and Method for Allocating OVSF Codes for Uplink Synchronous Transmission Scheme in a W-CDMA Communication System" filed in the Korean Industrial Property Office on Jun. 29, 2000 and assigned Serial No. 2000-37828; and an application entitled "Apparatus and Method for Allocating OVSF Codes for Uplink Synchronous Transmission Scheme in a W-CDMA Communication System" filed in the Korean Industrial Property Office on Jun. 30, 2000 and assigned Serial No. 2000-38095, the contents of which are hereby incorporated by reference.

BACKGROUND OF THE INVENTION

1. Field of the Invention

The present invention relates generally to a channel communication apparatus and method for a CDMA communication system, and in particular, to an apparatus and method for allocating OVSF codes for channel separation in a CDMA communication system.

2. Description of the Related Art

A CDMA (Code Division Multiple Access) communication system uses orthogonal codes (or orthogonal variable spreading factor (OVSF) codes) for channel separation, and the CDMA system is divided into a synchronous CDMA system and an asynchronous CDMA system. Herein, the present invention will be described with reference to an asynchronous CDMA communication system, which is typically called a W-CDMA (Wideband CDMA) or UMTS (Universal Mobile Terrestrial System) communication system. Specifically, a description will be made of an operation of allocating channels using OVSF codes in the W-CDMA communication system. However, the present invention can also be applied to a synchronous CDMA communication system such as a CDMA-2000 system.

FIG. 1 shows an architecture of a W-CDMA communication system. As shown in FIG. 1, every process for connection of a user equipment (UE) is controlled by a radio network controller (RNC or a base station controller (BSC) in the CDMA-2000 system). Further, allocation of resources to the UEs connected to base station transceivers (or Node B) is also controlled by the RNC which manages the base station transceivers (BTSs).

When a UE intends to use a common packet channel (CPCH) or a random access channel (RACH) to access a specific UTRAN (or a base station in the CDMA-2000 system) which is comprised of the RNC and the base station transceivers (or the Node B), the RNC provides the UE and the base station transceivers with information about available uplink channel resources for the CPCH or RACH, i.e., information about an uplink scrambling code and an OVSF code. The OVSF code, which is a kind of orthogonal code, has the same function as the Walsh code used in the CDMA-2000 system, and the RNC provides the base station transceivers with available OVSF code node set information.

When the connection between the UE and the base station transceiver is made successfully, the UE continues communication with the base station transceiver using an downlink or uplink dedicated physical channel (DPCH). The W-CDMA system employs an asynchronous scheme in which the channels are not synchronized with the base station transceivers. In this case, each UE must be assigned its unique scrambling code so that the base station transceiver can distinguish the UE.

Therefore, an uplink synchronous transmission scheme (USTS) has been proposed. By using the USTS, it is possible to assign one scrambling code to a plurality of UEs. The USTS can assign a single identical scrambling code to a plurality of UEs by acquiring synchronization when the UTRAN (UMTS Terrestrial Radio Access Network) receives the uplink DPCHs from the UEs. As a result, the number of the scrambling codes allocated in one cell is decreased, thus reducing mutual interference between the UE signals. The UTRAN distinguishes the UEs each employing the USTS by using channelization codes provided form the RNC, i.e., the OVSF codes maintaining orthogonality among them. Herein, a set of the UEs which are assigned the single identical scrambling code will be defined as a "USTS group", for convenience of explanation.

A process for acquiring uplink synchronization using the USTS scheme is divided into two processes, and the respective processes are described below.

A first process is an initial synchronization process, and in this process, the UTRAN receives a signal from the UE over the RACH and measures a difference between a time when the signal is received from the UE over the RACH and a predetermined reference time. Further, the UTRAN transmits the measured time difference to the UE over a forward access channel (FACH). Upon receipt of the time difference over the FACH, the UE aligns a transmission time using the time difference and acquires the initial synchronization.

A second process is a tracking process, and in this process, the UTRAN periodically compares the UE signal-received time with the reference time and transmits a time alignment bit to the UE through a transmit power control (TPC) bit on a control channel. Here, the time alignment bit is transmitted once per two frames, since it is transmitted through the TPC bit on the control channel. The time alignment bit can align the transmission time in a unit of n chips. In the case where the time alignment bit aligns the transmission time in a ⅛-chip unit, if the time alignment bit is '1', the UE advances the transmission time by ⅛ chip. Otherwise, if the time alignment bit is '0', the UE defers the transmission time by ⅛ chip.

Now, with reference to FIG. 2, a description will be made of the OVSF codes typically used for channel separation in the W-CDMA communication system.

The downlink can separate different channels using the OVSF codes, and the channels may have different data rates.

Meanwhile, the uplink separates the respective channels in one UE, or separates the channels of the respective UEs in the USTS in which the UEs use the same scrambling code. The OVSF code $C_{n,k}$ is uniquely determined according to a spreading factor (SF) 'n' and a code number 'k'. In the OVSF code $C_{n,k}$, 'n' indicates an SF value and 'k' has a value of $0 \leq k \leq SF-1$. The OVSF code $C_{n,k}$ is generated in accordance with Equation (1) below.

$$C_{1,0} = 1 \quad \text{Equation (1)}$$

$$\begin{bmatrix} C_{2,0} \\ C_{2,1} \end{bmatrix} = \begin{bmatrix} C_{1,0} & C_{1,0} \\ C_{1,0} & -C_{1,0} \end{bmatrix} = \begin{bmatrix} 1 & 1 \\ 1 & -1 \end{bmatrix}$$

$$\begin{bmatrix} C_{2^{(n+1)},0} \\ C_{2^{(n+1)},1} \\ C_{2^{(n+1)},2} \\ C_{2^{(n+1)},3} \\ \vdots \\ C_{2^{(n+1)},2^{(n+1)}-2} \\ C_{2^{(n+1)},2^{(n+1)}-1} \end{bmatrix} = \begin{bmatrix} C_{2^n,0} & C_{2^n,0} \\ C_{2^n,0} & -C_{2^n,0} \\ C_{2^n,1} & C_{2^n,1} \\ C_{2^n,1} & -C_{2^n,1} \\ \vdots & \vdots \\ C_{2^n,2^n-1} & C_{2^n,2^n-1} \\ C_{2^n,2^n-1} & -C_{2^n,2^n-1} \end{bmatrix}$$

The OVSF codes of from SF=1 to SF=4, generated in accordance with Equation (1), can be expressed by Equation (2) below.

Equation (2)

$C_{1,0}=(1)$ $C_{2,0}=(1, 1)$ $C_{2,1}=(1, -1)$ $C_{4,0}=(1, 1, 1, 1)$ $C_{4,1}=(1, 1, -1, -1)$ $C_{4,2}=(1, -1, 1, -1)$ $C_{4,3}=(1, -1, -1, 1)$

FIG. 2 shows an OVSF code tree. In the following description, $C_{n,k}$ in the OVSF code tree will be referred to as a "node". For example, an OVSF code $C_{1,0}$ will be referred to as "node $C_{1,0}$" or "$C_{1,0}$ node" in the OVSF code tree.

Referring to FIG. 2, a property of the OVSF codes will be described. Child nodes do not maintain orthogonality with their mother node. For example, if a node $C_{4,0}$ is allocated to a specific channel, the child nodes or sub-nodes $C_{8,0}$, $C_{8,1}$, $C_{16,0}$, $C_{16,1}$, $C_{16,2}$ and $C_{16,3}$ of the mother node $C_{4,0}$ cannot maintain orthogonality with all the mother nodes $C_{2,0}$ and $C_{1,0}$ corresponding to the mother node $C_{4,0}$, when they are allocated to the different channels. In the following description, a term "sub-tree" refers to all the child nodes of a specific node. That is, when $C_{4,0}=(1, 1, 1, 1)$ of Equation (2) is allocated to a specific channel, the orthogonality is not maintained among $C_{2,0}=(1, 1)$, $C_{8,0}=(1, 1, 1, 1, 1, 1, 1, 1)$ and $C_{8,1}=(1, 1, 1, 1, -1, -1, -1, -1)$. Therefore, when the OVSF codes are allocated to the channels having different SF values (or having different data rates), the OVSF codes should be so allocated as to maintain orthogonality with the allocated OVSF codes.

Now, with reference to FIG. 3, a description will be made of a process for spreading a dedicated physical control channel (DPCCH) and a dedicated physical data channel (DPDCH) using the OVSF codes. In general, only one DPDCH is used for SF$\geq$8, whereas a maximum of 6 DPDCHs can used for SF=4. As shown in FIG. 3, the channels can be divided into I-channel and Q-channel. Since the I-channel and the Q-channel can be separated by using a complex spreading code, they can be assigned the same channelization code. In FIG. 3, the DPCCH is assigned an OVSF code $C_{256,0}$ and the 6 DPDCHs are assigned the following channelization codes:

$$C_{d,n} = C_{4,k}$$

where, for n=1 or 2, k=1,
for n=3 or 4, k=3,
for n=5 or 6, k=2.

In the UEs using the USTS, the RNC allocates one uplink scrambling code and available OVSF codes as resources for the DPCHs. The RNC allocates the OVSF codes to separate the DPDCHs (data part) using SF=4, SF=16, SF=32, SF=64, SF=128 and SF=256 necessary for one DPCH, and the DPCCH (control part) using SF=256. The RNC provides the corresponding base station transceiver(node B) and the UE with the node information for the OVSF code of the DPCH (DPDCH and DPCCH) through a message.

Now, we assume SF=64 is the lowest node for the convenience of explanation. An OVSF code tree with SF=64 will be described with reference to FIG. 4. when SF of the DPDCH is 4 and a node $C_{4,1}$ is allocated in the OVSF code tree, the lowest node $C_{64,15}$ of a node $C_{4,0}$ belonging to the same mother node $C_{2,0}$ as the node $C_{4,1}$ is allocated as an OVSF code of the corresponding DPCCH. As another example, when SF of the DPDCH is 4 and a node $C_{4,2}$ is allocated in the OVSF code tree, the lowest node $C_{64,63}$ of a node $C_{4,3}$ belonging to the same mother node $C_{2,1}$ as the node $C_{4,2}$ is allocated as an OVSF code of the corresponding DPCCH.

As described above, in every channel or service having a pair of the DPCCH with the fixed SF value and the DPDCH with the variable SF value, the conventional OVSF code allocation method has the following disadvantages.

Since a node of the DPCCH is always allocated in a pair with a node of the DPDCH, the number of the OVSF codes allocable to the DPDCH is decreased. That is, when a specific node is allocated to the data part in the OVSF code tree (i.e., when an OVSF code of a specific node is allocated to separate the DPDCH channel), the OVSF codes of all the child nodes belonging to the allocated specific node do not maintain orthogonality with the previously allocated node of the DPDCH. Therefore, it is not possible to simultaneously allocate the child nodes of the allocated specific node to the data part. That is, when a node $C_{4,1}$ and a node $C_{4,2}$ with SF=4 are allocated to the DPDCHs, a node $C_{4,0}$ and a node $C_{4,3}$ must be allocated to the DPCCHs corresponding to the DPDCHs. Therefore, it is not possible to allocate the OVSF code with SF=4 for the data part, so that in the OVSF code tree structure shown in FIG. 4 the data part can be allocated a maximum of 2 channels with SF=4.

The conventional OVSF code allocation method has a limitation on use of the OVSF code, since when one child node connected to a specific mother node is allocated to the data part, the remaining one child node is allocated to the control part. As a result, the channel allocation resources run short. In order to solve the OVSF code allocation limitation problem, it is possible to increase the number of the available OVSF codes for the DPDCH by separately providing an OVSF code allocation area for the DPCCH. For example, it is possible to provide a maximum of 3 channels, by using every OVSF code with SF=64 belonging to the mother node $C_{4,0}$ only for the DPCCH and allocating the DPDCH to nodes $C_{4,1}$, $C_{4,2}$ and $C_{4,3}$ for the data part with SF=4.

SUMMARY OF THE INVENTION

It is, therefore, an object of the present invention to provide an apparatus and method for allocating an OVSF code such that a dedicated physical data channel (DPDCH) with a variable data rate and its associated dedicated physical control channel (DPCCH) are allocated in a pair in a CDMA communication system.

It is another object of the present invention to provide an apparatus and method for efficiently managing the limited OVSF code resources in a CDMA communication system.

It is further another object of the present invention to provide a method for grouping non-orthogonal nodes and allocating one OVSF code for a DPCCH to each group in a CDMA communication system.

It is yet another object of the present invention to provide an apparatus and method for enabling a UTRAN to efficiently allocate a channel to a user equipment (UE) in a CDMA communication system.

It is still another object of the present invention to provide an apparatus and method for enabling a UE to determine a channel depending on channel allocation-related information received from a UTRAN in a CDMA communication system.

It is still another object of the present invention to provide an apparatus and method for enabling a UTRAN to determine an OVSF code so as to allocate an uplink DPCH channel to a UE employing an uplink synchronous transmission scheme (USTS) in a CDMA communication system.

In accordance with one aspect, a channel allocation method in a CDMA communication system, comprises receiving from a UTRAN one SF node $C_{SF,k}$ out of $2^{m-1}$ SF nodes (where m is an integer larger than 3) arranged in the form of a tree having a mother node and child nodes; searching a group including the received SF node $C_{SF,k}$ in accordance with Formula (1) below spreading a signal on a dedicated physical data channel (DPDCH) with an OVSF code corresponding to a selected one of the received SF node and its child nodes in the searched group; and spreading a signal on a dedicated physical control channel (DPCCH) with an OVSF code corresponding to an SF node determined by Formula (2) below based on the received SF node.

$$\text{For } SF \leq \frac{2^{m-1}}{4}, (P_1 \cdot SF, P_1 \cdot k) = \left(\frac{2^{m-1}}{4}, n\right) \quad \text{Formula (1)}$$

$$\text{For } SF > \frac{2^{m-1}}{4}, \left(P_2 \cdot \frac{2^{m-1}}{4}, P_2 \cdot n\right) = (SF, k)$$

where, $P_1 = \frac{2^{m-1}}{4 \cdot SF}$ and $P_2 = \frac{4 \cdot SF}{2^{m-1}}$.

$$F\left(C_{\frac{2^{m-1}}{4} \cdot k}\right) = C_{2^{m-1}, 2^{m-1}-k-1} \, (k = 0, 1, \ldots) \quad \text{Formula (2)}$$

$$F\left(C_{\frac{2^{m-1}}{4} \cdot k}\right) = C_{2^{m-1}, 2^{m-1}-(k-32)} \, (k = 0, 1, \ldots).$$

Preferably, if a spreading factor in the SF node $C_{SF,k}$ is SF=64 and an associated spreading factor for a control part is SF=256, a spreading factor $C_{control,256,127-k}$ of the DPCCH is mapped to a spreading factor $C_{data,64,k}$ of the DPDCH, and a spreading factor $C_{control,256,255-k}$ of the DPCCH is mapped to a spreading factor $C_{data,64,32+k}$ of the DPDCH in accordance with Formula (3) below.

Formula (3)

$$F(C_{data,64,k}) = C_{control,256,127-k}$$

$$F(C_{data,64,32+k}) = C_{control,256,255-k}$$

where k=0, 1, 2, 3 . . . , 23.

Preferably, if a spreading factor in the SF node $C_{SF,k}$ is SF=64 and an associated spreading factor for a control part is SF=256, a spreading factor $C_{control,256,96+k}$ of the DPCCH is mapped to a spreading factor $C_{data,64,k}$ of the DPDCH, and a spreading factor $C_{control,256,224+k}$ of the DPCCH is mapped to a spreading factor $C_{data,64,32+k}$ of the DPDCH in accordance with Formula (4) below.

Formula (4)

$$F(C_{data,64,k}) = C_{control,256,96+k}$$

$$F(C_{data,64,32+k}) = C_{control,256,224+k}$$

where k=0, 1, 2, 3 . . . , 23.

Preferably, in the case where a spreading factor in the SF node $C_{SF,k}$ is SF=128 and an associated spreading factor for a control part is SF=256, when k in a spreading factor $C_{data,128,k}$ of the DPDCH is an even number, a spreading factor of the DPCCH is mapped according to Formula (5) below; when the k is an odd number, the spreading factor of the DPCCH is mapped according to Formula (6) below; when k in a spreading factor $C_{data,64,32+k}$ of the DPDCH is an even number, the spreading factor of the DPCCH is mapped according to Formula (7) below; and when the k is an odd number, the spreading factor of the DPCCH is mapped according to Formula (8) below.

Formula (5)

$$F(C_{data,128,k}) = C_{control,256,127-k}$$

Formula (6)

$$F7(C_{data,128,2n+1}) = F7(C_{data,128,2(n+8)+1}) = F7(C_{data,128,2(n+16)+1}) = C_{control,256,103-n},$$

(for $0 \leq n \leq 7$)

Formula (7)

$$F(C_{data,128,64+k}) = C_{control,256,255-k}$$

where k=0, 2, 4, . . . , 22

Formula (8)

$$F7(C_{data,128,64+2n+1}) = F7(C_{data,128,64+2(n+8)+1}) = F7(C_{data,128,64+2(n+16)+1}) = C_{control,256,207-n},$$

(for $0 \leq n \leq 7$)

where k=1, 3, . . . , 23.

In accordance with another aspect of the present invention, an uplink channel transmission apparatus for a user equipment (UE) in a CDMA communication system, comprises a memory for storing $2^{m-1}$ SF nodes (where m is an integer larger than 3) arranged in the form of a tree having a mother node and child nodes; an input unit for receiving one SF node $C_{SF,k}$ from a UTRAN; an OVSF code allocating device for searching a group including the received SF node $C_{SF,k}$ according to Formula (9) below, selecting one node for a data part out of the received SF node and associated child nodes from the searched group, and selecting an SF node for a control part determined according to Formula (10) below based on the received SF node; an OVSF code generator for generating OVSF codes for a DPDCH and a DPCCH corresponding to the selected SF nodes of the data part and the control part; a DPDCH spreader for spreading a signal on the DPDCH with the generated OVSF code for the data part; and a DPCCH spreader for spreading a signal on the DPCCH with the generated OVSF code for the control part.

$$\text{For } SF \leq \frac{2^{m-1}}{4}, (P_1 \cdot SF, P_1 \cdot k) = \left(\frac{2^{m-1}}{4}, n\right) \quad \text{Formula (9)}$$

$$\text{For } SF > \frac{2^{m-1}}{4}, \left(P_2 \cdot \frac{2^{m-1}}{4}, P_2 \cdot n\right) = (SF, k)$$

$$\text{where, } P_1 = \frac{2^{m-1}}{4 \cdot SF} \text{ and } P_2 = \frac{4 \cdot SF}{2^{m-1}}.$$

$$F\left(C_{\frac{2^{m-1}}{4} \cdot k}\right) = C_{2^{m-1}, 2^{m-1}-k-1} \ (k = 0, 1, \ldots) \quad \text{Formula (10)}$$

$$F\left(C_{\frac{2^{m-1}}{4} \cdot k}\right) = C_{2^{m-1}, 2^{m-1}-(k-32)} \ (k = 0, 1, \ldots)$$

In accordance with further another aspect of the present invention, an uplink channel transmission apparatus for a UTRAN in a CDMA communication system, comprises a memory for storing $2^{m-1}$ SF nodes (where m is an integer larger than 3) arranged in the form of a tree having a mother node and child nodes; an input unit for receiving one SF node $C_{SF,k}$ from a UE; an OVSF code allocating device for searching a group including the received SF node $C_{SF,k}$ according to Formula (11) below, selecting one node for a data part out of the received SF node and associated child nodes from the searched group, and selecting an SF node for a control part determined according to Formula (12) below based on the received SF node; an OVSF code generator for generating OVSF codes for a DPDCH and a DPCCH corresponding to the selected SF nodes of the data part and the control part; a DPDCH despreader for despreading a signal on the DPDCH with the generated OVSF code for the data part; and a DPCCH despreader for despreading a signal on the DPCCH with the generated OVSF code for the control part.

$$\text{For } SF \leq \frac{2^{m-1}}{4}, (P_1 \cdot SF, P_1 \cdot k) = \left(\frac{2^{m-1}}{4}, n\right) \quad \text{Formula (11)}$$

$$\text{For } SF > \frac{2^{m-1}}{4}, \left(P_2 \cdot \frac{2^{m-1}}{4}, P_2 \cdot n\right) = (SF, k)$$

$$\text{where, } P_1 = \frac{2^{m-1}}{4 \cdot SF} \text{ and } P_2 = \frac{4 \cdot SF}{2^{m-1}}.$$

$$F\left(C_{\frac{2^{m-1}}{4} \cdot k}\right) = C_{2^{m-1}, 2^{m-1}-k-1} \ (k = 0, 1, \ldots) \quad \text{Formula (12)}$$

$$F\left(C_{\frac{2^{m-1}}{4} \cdot k}\right) = C_{2^{m-1}, 2^{m-1}-(k-32)} \ (k = 0, 1, \ldots)$$

In accordance with yet another aspect of the present invention, there is provided an OVSF code allocation method in a CDMA communication system. In the method, $2^{m-1}$ SF nodes are arranged in the form of a tree in m=1 column, the SF nodes are divided into a pair of trees having first and second half SF nodes obtained by halving first SF nodes in a column corresponding to the maximum SF, wherein each tree allocates an OVSF code corresponding to one of some SF nodes in an m+1$^{th}$ column which becomes child nodes of one node out of second SF nodes following the first SF nodes as a first OVSF code for spreading a control signal, and allocates a second OVSF code corresponding to one of the remaining nodes which maintain orthogonality with said one of the second SF nodes to spread a data signal.

Preferably, the maximum SF node is $C_{4,k}$ (where k=0, 1, 2, 3), the first SF nodes include $C_{4,0}$ and $C_{4,2}$, the second SF nodes include $C_{4,1}$ and $C_{4,3}$, the second SF node $C_{4,1}$ includes child nodes $C_{8,2}$ and $C_{8,3}$, the second SF node $C_{4,3}$ includes child nodes $C_{8,6}$ and $C_{8,7}$, the child nodes $C_{8,3}$ and $C_{8,7}$ are allocated as the second OVSF code for spreading the control signal, and the remaining nodes are allocated as the first OVSF code for spreading the data signal.

Preferably, the first OVSF codes for spreading the data signal and the second OVSF codes for spreading the control signal are so allocated as to be mapped according to Formula (13) below.

Formula (13)

$$F(C_{data,64,k}) = C_{control,256,127-k}$$

$$F(C_{data,64,32+k}) = C_{control,256,255-k}$$

where a spreading factor of the data signal is SF=64, a spreading factor of the control signal is SF=256, and k=0, 1, 2, 3, ..., 23.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In a first embodiment of the present invention, it will be assumed that a control part of the dedicated physical channel (DPCH) has a spreading factor (SF) of 256 and a data part has an SF value of 4, 8, 16, 32 and 64. In a second embodiment, it will be assumed that a control part of the CPCH has an SF value of 256 and a data part has an SF value of 4, 8, 16, 32, 64, 128 and 256. An OVSF code allocation method according to the present invention is applicable to a channel or a service in which a data part and a control part are provided in a pair as in the RACH and CPCH, and the novel OVSF code allocation method is not restricted by the SF value.

Figure 4:
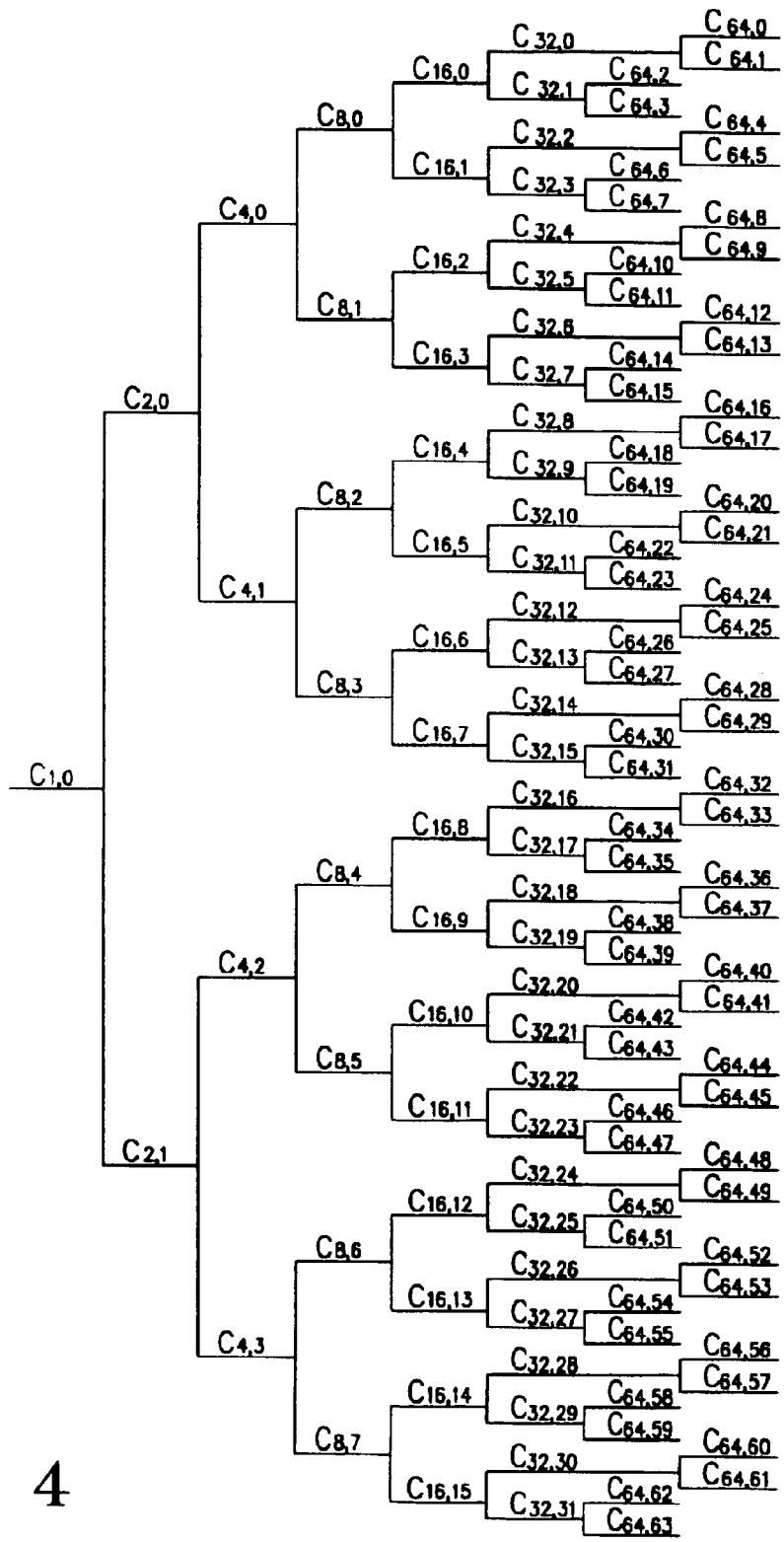
FIG. 4 is a diagram illustrating an OVSF code tree for SF=64 in the W-CDMA communication system.

In a mobile communication system which services the channels where the data part and the control part exist in a pair, the method according to the present invention allocates a specific one node in the OVSF code tree comprised of a plurality of nodes as an OVSF code of the control part, and allocates the remaining nodes as an OVSF code of the data part. In the embodiments of the present invention, the OVSF code tree is divided into 4 nodes, and three of the nodes are allocated to the data part while the remaining one node is allocated to the control part. That is, the orthogonality is not maintained among the nodes $C_{4,0}$, $C_{8,0}$, $C_{16,0}$, $C_{32,0}$ and $C_{64,0}$ as shown in FIG. 4. Thus, if one of the nodes is allocated to a specific channel, then the remaining nodes cannot be allocated to other channels in view of the property of the OVSF code tree. Therefore, the invention classifies the non-orthogonal nodes $C_{4,0}$, $C_{8,0}$, $C_{16,0}$, $C_{32,0}$ and $C_{64,0}$ into groups (or sub-trees) and allocates a node corresponding to one of the groups to the control part. As a result, it is possible to simultaneously allocate a maximum of $(2/3)*SF$ nodes to the data parts with respect to each SF.

First Embodiment

First, a sub-tree of a $C_{4,3}$ node which is one of the nodes with SF=4 is allocated to the control part. Although the $C_{4,3}$ node is allocated to the control part in the following description, it is also possible to selectively allocate one of the nodes $C_{4,0}$, $C_{4,1}$ and $C_{4,2}$ other than the node $C_{4,3}$ out of the SF=4 nodes to the control part. Since the nodes existing in the sub-tree of the $C_{4,3}$ node are allocated to the control part, they are not allocated for the data part. Instead, the 12 SF=64 nodes $C_{64,52}$, $C_{64,53}$, $C_{64,54}$, ..., $C_{64,63}$ are defined as nodes for the control part (or control part nodes). A definition of one-to-one mapping between the control part nodes $C_{64,52}$, $C_{64,53}$, $C_{64,54}$, ..., $C_{64,63}$ and SF=16 data part nodes $C_{16,0}$, $C_{16,1}$, $C_{16,2}$, ..., $C_{16,11}$ will be given. Here, the node mapping is performed using a mapping function $F1(C_{data,16,k})=C_{control,64,63-k}$ ($0 \leq k \leq 11$), where $C_{data,16,k}$ denotes node $C_{16,k}$ for the data part and $C_{control,64,63-k}$ denotes a node $C_{64,63-k}$ for the control part. For the respective F=16 data part nodes, it is possible to group the non-orthogonal nodes as shown in Table 1 using the following rules.

TABLE 1

| Data Part | | | Control Part |
|---|---|---|---|
| SF = 4 | SF = 8 | SF = 16 | (SF = 64) |
| $C_{4,0}$ | $C_{8,0}$ | $C_{16,0}$ | $C_{64,63}$ |
| | | $C_{16,1}$ | $C_{64,62}$ |
| | $C_{8,1}$ | $C_{16,2}$ | $C_{64,61}$ |
| | | $C_{16,3}$ | $C_{64,60}$ |
| $C_{4,1}$ | $C_{8,2}$ | $C_{16,4}$ | $C_{64,59}$ |
| | | $C_{16,5}$ | $C_{64,58}$ |
| | $C_{8,3}$ | $C_{16,6}$ | $C_{64,57}$ |
| | | $C_{16,7}$ | $C_{64,56}$ |
| $C_{4,2}$ | $C_{8,4}$ | $C_{16,8}$ | $C_{64,55}$ |
| | | $C_{16,9}$ | $C_{64,54}$ |
| | $C_{8,5}$ | $C_{16,10}$ | $C_{64,53}$ |
| | | $C_{16,11}$ | $C_{64,52}$ |

Table 1 shows an example where the node $C_{64,63-k}$ is allocated to the control part. However, when nodes $C_{64,48+k}$ are allocated to the control part, it is possible to sequentially allocate the nodes of from $C_{64,48}$ to $C_{64,59}$ to the control part. In addition, the same results can be obtained even if the nodes are properly set such that the nodes allocated to the control part should be one-to-one mapped with the nodes allocated to the data part.

<Rule 1>

If there exists p which satisfies $(p*SF, p*k)=(16, n)$ for $SF \leq 16$ or $(p*16, p*n)=(SF, k)$ for $SF>16$, $C_{SF,K}$ and $C_{16,n}$ belong to one group. Here, $0 \leq k \leq 3*SF/4-1$.

Every $SF \leq 16$ (SF=4, SF=8 and SF=16) OVSF code for the data part and the control part are determined according to Rule 1. In addition, for SF>16 (SF=32, SF=64, SF=128, ...), some nodes can be applied to Rule 1, but the other nodes cannot not be applied to Rule 1, and there is a known method for avoiding use of these nodes. Therefore, an additional mapping rule is required for the control part for the nodes which are not used when Rule 1 is applied thereto. By using the mapping rule, it is possible to use the nodes $C_{64,51}$, $C_{64,50}$, $C_{64,49}$ and $C_{64,48}$ which are not allocated to the control part. That is, for SF=32, each of the nodes $C_{32,k}$ (where k is odd or even number) is associated with the nodes for the control part allocated to the node $C_{16,k}$, and for SF=64, each of the nodes $C_{64,k}$ (where k is a multiple of 4, (a multiple of 4)-1, (a multiple of 4)-2, or (a multiple of 4)-4) is associated with the nodes for the control part allocated to the node $C_{16,k}$. Further, the remaining nodes for the data parts which are not allocated to the nodes for the control part are allocated according to the additional mapping rule. In this embodiment, it will be assumed that the additional mapping rule is required for the SF=32 nodes $C_{32,k}$ (where k is the odd number) of $C_{32,1}$, $C_{32,3}$, $C_{32,5}$, ..., $C_{32,21}$, $C_{32,23}$ and the SF=64 nodes $C_{64,k}$ (where k is not a multiple of 4) of $C_{64,1}$, $C_{64,2}$, $C_{64,3}$, $C_{64,5}$, $C_{64,6}$, $C_{64,7}$, $C_{64,9}$, ..., $C_{64,43}$, $C_{64,45}$, $C_{64,46}$, $C_{64,47}$. Although this mapping rule can be modified into various types, the basic mapping rule is as follows.

(1) SF=32

In this case, the $C_{32,k}$ (where k is the even number) nodes of $C_{32,0}$, $C_{32,2}$, $C_{32,4}$, $C_{32,6}$, ..., $C_{32,22}$ are mapped to the 12 control part nodes of $C_{64,63}$, $C_{64,62}$, $C_{64,61}$, $C_{64,60}$, ..., $C_{64,52}$, respectively. Further, the 4 nodes $C_{64,48}$, $C_{64,49}$, $C_{64,50}$ and $C_{64,51}$ out of the SF=64 nodes in the sub-tree of the node $C_{4,3}$ are currently not used. Therefore, these nodes can be used for the control part of the SF=32 nodes $C_{32,k}$ (where k is the odd number) of $C_{32,1}$, $C_{32,3}$, $C_{32,5}$, $C_{32,7}$, ..., $C_{32,23}$. For example, it is possible to set a multiple-to-one function between the 12 SF=32 nodes and the 4 control parts as given below.

<Rule 2>

$F2(C_{data,32,2n+1})=F2(C_{data,32,2(n+4)+1})=F2(C_{data,32,2(n+8)+1})=C_{control,64,51-n}$ (for $0 \leq n \leq 3$)

Therefore, when the additional mapping rule given as Rule 2 is used, the SF=32 data part nodes $C_{32,k}$ (where k is the odd number) are allocated to the non-allocated control part nodes $C_{64,51}$, $C_{64,50}$, $C_{64,49}$ and $C_{64,48}$, as shown in Table 2 below.

TABLE 2

| | Data Part | | | |
|---|---|---|---|---|
| n | F2 ($C_{data,32,2n+1}$) | F2 ($C_{data,32,2(n+4)+1}$) | F2 ($C_{data,32,2(n+8)+1}$) | Control Part |
| n = 0 | $C_{32,1}$ | $C_{32,9}$ | $C_{32,17}$ | $C_{64,51}$ |
| n = 1 | $C_{32,3}$ | $C_{32,11}$ | $C_{32,19}$ | $C_{64,50}$ |
| n = 2 | $C_{32,5}$ | $C_{32,13}$ | $C_{32,21}$ | $C_{64,49}$ |
| n = 3 | $C_{32,7}$ | $C_{32,15}$ | $C_{32,23}$ | $C_{64,48}$ |

Therefore, Table 3 below is given by allocating the data parts of the $C_{32,k}$ nodes to the nodes for the control part using the results of Table 2.

TABLE 3

| Data Part | | | | Control Part |
|---|---|---|---|---|
| SF = 4 | SF = 8 | SF = 16 | SF = 32 | (SF = 64) |
| $C_{4,0}$ | $C_{8,0}$ | $C_{16,0}$ | $C_{32,0}$ | $C_{64,63}$ |
| | | | $C_{32,1}$ | $C_{64,51}$ |
| | | $C_{16,1}$ | $C_{32,2}$ | $C_{64,62}$ |
| | | | $C_{32,3}$ | $C_{64,50}$ |
| | $C_{8,1}$ | $C_{16,2}$ | $C_{32,4}$ | $C_{64,61}$ |
| | | | $C_{32,5}$ | $C_{64,49}$ |
| | | $C_{16,3}$ | $C_{32,6}$ | $C_{64,60}$ |
| | | | $C_{32,7}$ | $C_{64,48}$ |
| $C_{4,1}$ | $C_{8,2}$ | $C_{16,4}$ | $C_{32,8}$ | $C_{64,59}$ |
| | | | $C_{32,9}$ | $C_{64,51}$ |
| | | $C_{16,5}$ | $C_{32,10}$ | $C_{64,58}$ |
| | | | $C_{32,11}$ | $C_{64,50}$ |
| | $C_{8,3}$ | $C_{16,6}$ | $C_{32,12}$ | $C_{64,57}$ |
| | | | $C_{32,13}$ | $C_{64,49}$ |
| | | $C_{16,7}$ | $C_{32,14}$ | $C_{64,56}$ |
| | | | $C_{32,15}$ | $C_{64,48}$ |
| $C_{4,2}$ | $C_{8,4}$ | $C_{16,8}$ | $C_{32,16}$ | $C_{64,55}$ |
| | | | $C_{32,17}$ | $C_{64,51}$ |
| | | $C_{16,9}$ | $C_{32,18}$ | $C_{64,54}$ |
| | | | $C_{32,19}$ | $C_{64,50}$ |
| | $C_{8,5}$ | $C_{16,10}$ | $C_{32,20}$ | $C_{64,53}$ |
| | | | $C_{32,21}$ | $C_{64,49}$ |
| | | $C_{16,11}$ | $C_{32,22}$ | $C_{64,52}$ |
| | | | $C_{32,23}$ | $C_{64,48}$ |

(2) SF=64

The mapping rule for SF=64 is divided into the following several cases according to a remainder obtained by dividing k in $C_{64,k}$ by 4. First, when k in the node $C_{64,k}$ is a multiple of 4, this node is determined as a node for the control part according to Rule 2. Second, when a remainder obtained by dividing k by 4 is 2 (i.e., k=4n+2) and is 3 (i.e., k=4n+3), a node for the case where the remainder obtained by dividing k by 4 is 2 is set for the data part, and a node for the case where the remainder obtained by dividing k by 4 is 3 is set for the control part, respectively, according to Rule 3.

<Rule 3>

$$F3(C_{data,64,4n+2})=C_{control,64,4n+3} \quad (0 \leq n \leq 11)$$

Third, when a remainder obtained by dividing k by 4 is 1 (i.e., k=4n+1), there exist a total of 12 nodes. There are several methods for allocating the 12 nodes to the data part and the control part. As one example, the following mapping rule is set.

<Rule 4>

$$F4\text{-}1(C_{data,64,4n+1})=C_{control,64,51-n} \quad (0 \leq n \leq 3)$$

$$F4\text{-}2(C_{data,64,4(n+4)+1})=C_{control,64,4n+1} \quad (0 \leq n \leq 3)$$

By using this mapping rule, it is possible to simultaneously allocate ¾ the total nodes with respect to each SF for SF≦16, and ½ the total nodes with respect to each SF for SF≦32 as in the prior art.

Second Embodiment

The second embodiment is considered for the case where SF=256 is allocated for the control part, and SF=4, SF=8, SF=16, SF=32, SF=64, SF=128 and SF=256 are allocable for the data part. Here, even when SF=32, SF=64, SF=128 and SF=256 can be allocated for the data part as in the RACH (Random Access Channel), it is possible to use the mapping rule for the data part and the control part by using the following rule. As in the first embodiment where SF for the control part is 64, even when SF for the control part is 256, a sub-tree of any one of SF=4 nodes is used for the control part. For convenience, this node will be assumed to be $C_{4,4}$. A normal mapping rule for the 48 SF=64 nodes and 48 SF=256 nodes for the data part is defined as follows.

<Rule 5>

$$F5(C_{data,64,k})=C_{control,256,255-k}$$

According to Rule 5, $C_{data,64,k}$ nodes for the data part are allocated to $C_{control,256,256-k}$ nodes for the control part as shown in Table 4 below.

TABLE 4

| Data Part | | | | | Control Part |
|---|---|---|---|---|---|
| SF = 4 | SF = 8 | SF = 16 | SF = 32 | SF = 64 | (SF = 256) |
| $C_{4,0}$ | $C_{8,0}$ | $C_{16,0}$ | $C_{32,0}$ | $C_{64,0}$ | $C_{256,255}$ |
| | | | | $C_{64,1}$ | $C_{256,254}$ |
| | | | $C_{32,1}$ | $C_{64,2}$ | $C_{256,253}$ |
| | | | | $C_{64,3}$ | $C_{256,252}$ |
| | | $C_{16,1}$ | $C_{32,2}$ | $C_{64,4}$ | $C_{256,251}$ |
| | | | | $C_{64,5}$ | $C_{256,250}$ |
| | | | $C_{32,3}$ | $C_{64,6}$ | $C_{256,249}$ |
| | | | | $C_{64,7}$ | $C_{256,248}$ |
| | $C_{8,1}$ | $C_{16,2}$ | $C_{32,4}$ | $C_{64,8}$ | $C_{256,247}$ |
| | | | | $C_{64,9}$ | $C_{256,246}$ |
| | | | $C_{32,5}$ | $C_{64,10}$ | $C_{256,245}$ |
| | | | | $C_{64,11}$ | $C_{256,244}$ |
| | | $C_{16,3}$ | $C_{32,6}$ | $C_{64,12}$ | $C_{256,243}$ |
| | | | | $C_{64,13}$ | $C_{256,242}$ |
| | | | $C_{32,7}$ | $C_{64,14}$ | $C_{256,241}$ |
| | | | | $C_{64,15}$ | $C_{256,240}$ |
| $C_{4,1}$ | $C_{8,2}$ | $C_{16,4}$ | $C_{32,8}$ | $C_{64,16}$ | $C_{256,239}$ |
| | | | | $C_{64,17}$ | $C_{256,238}$ |
| . | . | . | . | . | . |
| . | . | . | . | . | . |
| . | . | . | . | . | . |
| | | | $C_{32,15}$ | $C_{64,31}$ | $C_{256,225}$ |
| | | | | $C_{64,32}$ | $C_{256,224}$ |
| $C_{4,2}$ | $C_{8,4}$ | $C_{16,8}$ | $C_{32,16}$ | $C_{64,33}$ | $C_{256,223}$ |
| | | | | $C_{64,34}$ | $C_{256,222}$ |
| | | | $C_{32,17}$ | $C_{64,35}$ | $C_{256,221}$ |
| | | | | $C_{64,36}$ | $C_{256,220}$ |
| | | $C_{16,9}$ | $C_{32,18}$ | $C_{64,37}$ | $C_{256,219}$ |
| | | | | $C_{64,38}$ | $C_{256,218}$ |
| | | | $C_{32,19}$ | $C_{64,39}$ | $C_{256,217}$ |
| | | | | $C_{64,40}$ | $C_{256,216}$ |
| | $C_{8,5}$ | $C_{16,10}$ | $C_{32,20}$ | $C_{64,41}$ | $C_{256,215}$ |
| | | | | $C_{64,42}$ | $C_{256,214}$ |
| | | | $C_{32,21}$ | $C_{64,43}$ | $C_{256,213}$ |
| | | | | $C_{64,44}$ | $C_{256,212}$ |
| | | $C_{16,11}$ | $C_{32,22}$ | $C_{64,45}$ | $C_{256,211}$ |
| | | | | $C_{64,46}$ | $C_{256,210}$ |
| | | | $C_{32,23}$ | $C_{64,47}$ | $C_{256,209}$ |
| | | | | $C_{64,48}$ | $C_{256,208}$ |

According to this mapping rule, the nodes for the control part associated with the data part corresponding to the 48 SF=64 nodes are determined as shown in Table 4. The nodes which will share the same control part with the 48 SF=64 nodes are classified into one group using the following rule.

<Rule 6>

If there exists p which satisfies (p*SF, p*k)=(64, n) for SF≦16 or (p*64, p*n)=(SF, k) for SF>64, $C_{SF,k}$ and $C_{64,n}$ belong to one group. Here, 0≦k≦3*SF/4-1.

When the mapping rule of Rule 6 is used, the control part nodes for the data part nodes are determined as shown in Table 4 for SF≦64, and it is possible to simultaneously allocate the 3*SF/4 data part nodes per SF. In Rule 6, a mapping rule is required for SF=128 $C_{data,128,k}$ nodes (where k is the odd number) of $C_{128,1}$, $C_{128,3}$, $C_{128,5}$, $C_{128,7}$, . . . ,$C_{128,95}$ and the SF=256 nodes $C_{data,256,k}$ (where k is not a multiple of 4) of $C_{256,1}$, $C_{256,2}$, $C_{256,3}$, $C_{256,5}$, $C_{256,6}$, $C_{256,7}$, $C_{256,9}$, . . . , $C_{256,187}$, $C_{256,189}$, $C_{256,190}$, $C_{256,191}$. Typical examples are given below.

(1) SF=128

The 16 nodes $C_{256,192}, C_{256,193}, C_{256,194}, \ldots, C_{256,207}$ out of the SF=256 nodes in the sub-tree of the node $C_{4,3}$ are currently not used. Therefore, these nodes can be used for the control part of the SF=128 nodes $C_{128,k}$ (where k is the odd number). For example, it is possible to set a multiple-to-one function between the 48 SF=128 nodes and 16 SF=256 control part nodes, as given below.

<Rule 7>

$$F7\ (C_{data,128,2n+1}) = F7(C_{data,128,2(n+16)+1}) = F7(C_{data,128,2(n+32)+1}) = C_{control,256,207-n}$$

(for $0 \leq n \leq 15$)

(2) SF=256

The mapping rule for SF=256 is divided into the following several cases according to a remainder obtained by dividing k in $C_{256,k}$ by 4. First, when k in the node $C_{256,k}$ is a multiple of 4, this node is determined as a node for the control part according to Rule 7. Second, when a remainder obtained by dividing k by 4 is 2 (i.e., k=4n+2) and is 3 (i.e., k=4n+3), a node for the case where the remainder obtained by dividing k by 4 is 2 is set for the data part, and a node for the case where the remainder obtained by dividing k by 4 is 3 is set for the control part, respectively, according to Rule 8.

<Rule 8>

$$F8(C_{data,256,4n+2}) = C_{control,256,4n+3}\ (0 \leq n \leq 47)$$

Third, when a remainder obtained by dividing k by 4 is 1 (i.e., k=4n+1), there exist a total of 48 nodes. There are several methods for allocating the 48 nodes to the data part and the control part. As one example, the following mapping rule is set.

<Rule 9>

$$F9\text{-}1(C_{data,256,4n+1}) = C_{control,256,207-n}\ (0 \leq n \leq 15)$$

$$F9\text{-}2(C_{data,256,4(n+16)+1}) = C_{control,256,4n+1}\ (0 \leq n \leq 15)$$

By using this mapping rule, it is possible to simultaneously allocate ¾ the total nodes with respect to each SF for SF≦64, and ½ the total nodes with respect to each SF for SF≦128 as in the prior art.

Accordingly, the mapping rules can be expressed by the following formula.

The UTRAN can allocate one of the OVSF code nodes $C_{data,SF,k}$ in one scrambling code to the UE.

$$C_{data,SF,k} \quad \text{Equation (3)}$$

$$k = 0, 1, 2, \ldots, \frac{3}{4} \times SF - 1\ (\text{where } SF \leq 64)$$

$$k = 0, 2, 4, \ldots, 94\ (\text{for } SF = 128)$$

$$k = 0, 4, 8, \ldots, 188\ (\text{for } Sf = 256)$$

In Equation (3), the SF value is determined as one of SF=4, SF=8, SF=16, SF=32, SF=64, SF=128 and SF=256. Upon receipt of one OVSF code node based on Equation (3) from the UTRAN, the UE can use upper branch nodes with the higher SF values in the sub-code tree. For example, a UE which is assigned a $C_{data,8,1}$ node can use the upper branch nodes with SF>8 in the sub-code tree, i.e., the codes of $C_{data,16,2}, C_{data,32,4}, C_{data,64,8}, C_{data,128,16},$ and $C_{data,256,32}$.

After being assigned the $C_{data,SF,k}$ code for the DPDCH, the UE transmits a $C_{control,256,256-n}$ node according to the above mapping rule. Further, n in the node $C_{control,256,256-n}$ is determined by Equation (4) below.

Equation (4)

$$n = k * 64/SF$$

The mapping for k=1, 3, 5, ..., 93, 95 for SF=128 and k=1, 2, 3, 5, 6, 7, ..., 187, 189, 190, 191 for SF=256, excluded from Equation (3), can be performed using the mapping rules of Rules 7, Rule 8 and Rule 9.

Figure 5:
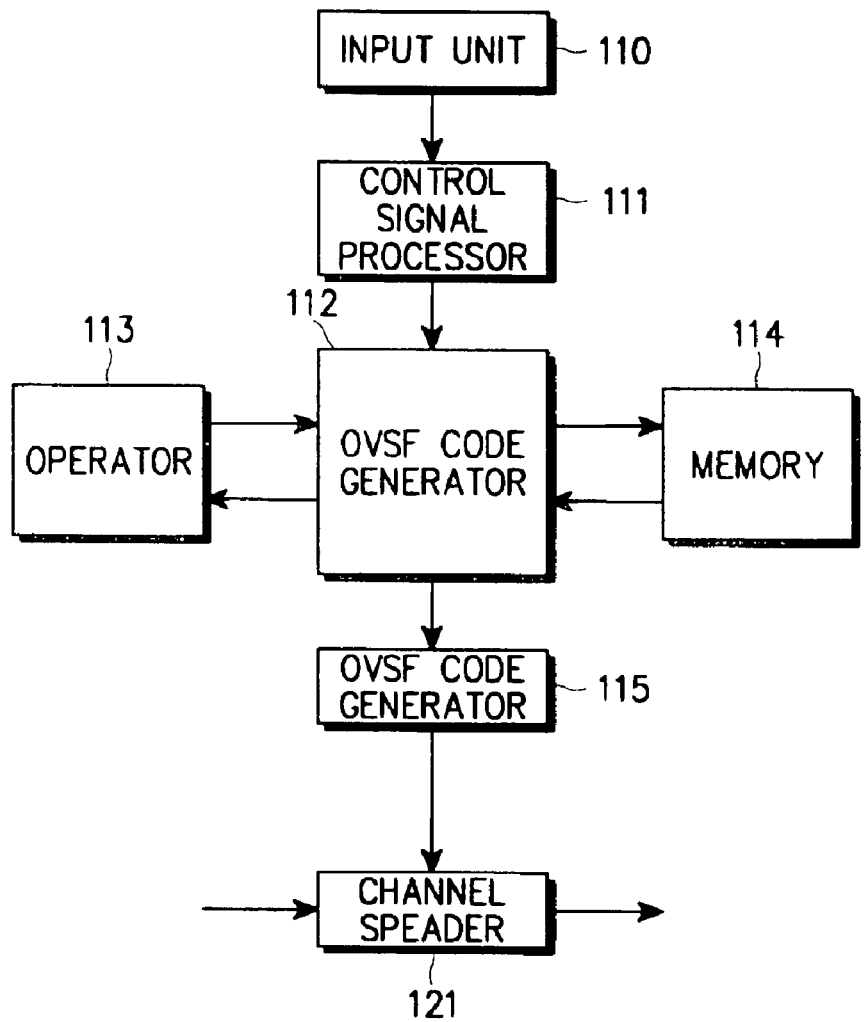
FIG. 5 is a block diagram illustrating an OVSF code generating device for a UTRAN in a CDMA communication system according to an embodiment of the present invention.

FIG. 5 shows a device for generating OVSF codes for the dedicated physical data channel (DPDCH) and the dedicated physical control channel (DPCCH) in the UTRAN according to an embodiment of the present invention. This device can be used for an OVSF code generating device in the uplink receiver for the UTRAN.

Referring to FIG. 5, an input unit 110 receives a control signal for the OVSF code, and the control signal includes SF information of the data part. A control signal processor 111 processes the control signal provided from the input unit 110 and provides the SF information of the data part to an OVSF code processor 112. The OVSF code processor 112 then determines a node for the data part using the SF information of the data part, and controls the process of determining a node for the control part corresponding to the determined node for the data part. A memory 114 includes OVSF node set information provided from the RNC and stores not only node information of the previously allocated data part and control part but also node information of the data part and control part which are allocable later. The OVSF code processor 112 determines the node for the data part by consulting the node information for the allocable data part, stored in the memory 114. An operator 113 performs an operation of determining the node information of the control part according to a command from the OVSF code processor 112. A detailed description of an algorithm for the operator 113 will be made later with reference to FIG. 7. Here, the control signal processor 111, the OVSF code processor 112, the operator 113 and the memory 114 constitute an OVSF code allocation device for searching a channelization code for the data part and an OVSF code for the data part and allocating the channelization code for the control part mapped to the OVSF code for the data part. The set data part and control part node information is provided to an OVSF code generator 115, and the OVSF code generator 115 generates an OVSF code $C_{data,SF,k}$ (or an OVSF code $C_{data,SF,k}$ and an OVSF code $C_{data,SF,(SF/2)-k}$) for spreading channel data on the data part and an OVSF code $C_{control,4SF,SF-1-k}$ (or an OVSF code $C_{control,4SF,2SF-1-k}$ and an OVSF code $C_{control,4SF,4SF-1-k}$) for spreading channel data on the control part. Then, a channel despreader 121 multiplies a descrambled signal by the OVSF code for the data part to despread the signal on the data channel, and the channel despreader 121 multiplies the descrambled signal by the OVSF code for the control part to despread the signal on the control channel.

Figure 6:
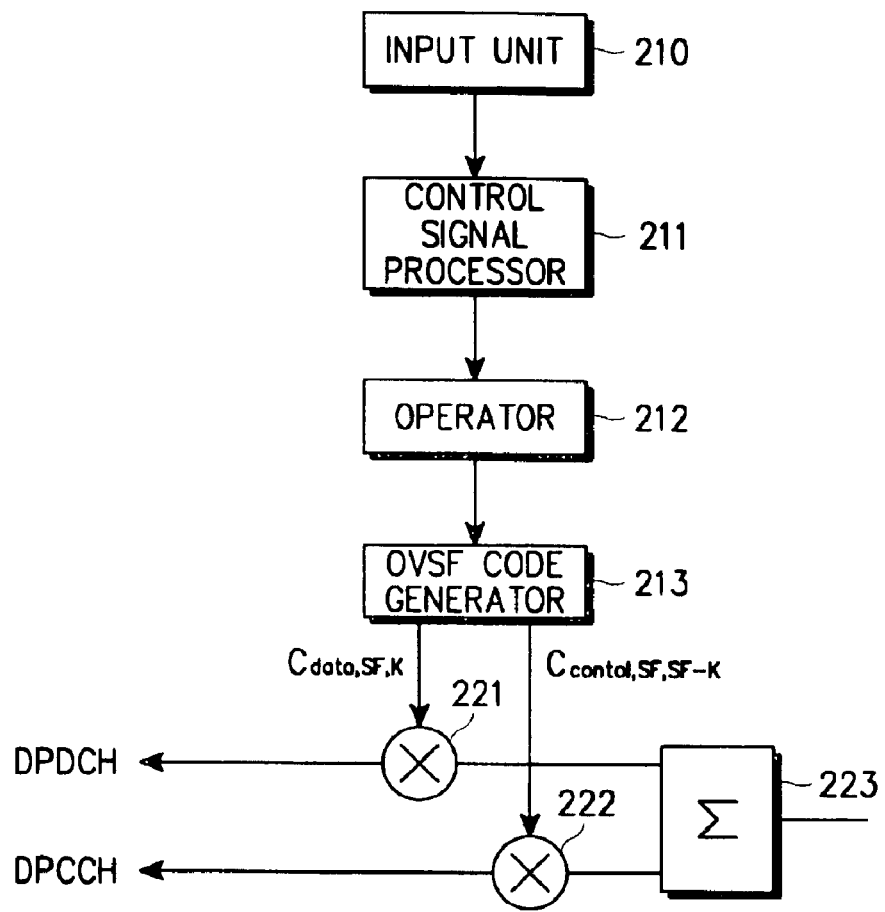
FIG. 6 is a block diagram illustrating an OVSF code generating device for a user equipment (UE) in a CDMA communication system according to an embodiment of the to present invention.

FIG. 6 shows a device for generating OVSF codes for a dedicated physical data channel (DPDCH) and a dedicated physical control channel (DPCCH) in a user equipment (UE) according to an embodiment of the present invention. This OVSF code generating device can be used for an uplink channel transmission device.

Referring to FIG. 6, an input unit 210 receives a control signal for an OVSF code for the data part from the UTRAN, and the control signal includes node information of the data part. A control signal processor 211 processes the control signal provided from the input unit 210 and provides the node information of the data part to an operator 212. The operator 212 performs an operation of determining the node information of the control part. A detailed description of an algorithm for the operator 212 will be made later with reference to FIG. 7. Here, the control signal processor 211 and the operator 212 constitute an OVSF code allocation device for searching a channelization code for the data part and an OVSF code for the data part and allocating the channelization code for the control part mapped to the OVSF code for the data part. The set data part and control part node information is provided to an OVSF code generator 213, and the OVSF code generator 213 generates an OVSF code $C_{data,SF,k}$ (or an OVSF code $C_{data,SF,k}$ and an OVSF code $C_{data,SF,(SF/2)-k}$) for spreading channel data on the data part and an OVSF code $C_{control,4SF,SF-1-k}$ (or an OVSF code $C_{control,4SF,2SF-1-k}$ and an OVSF code $C_{control,4SF,4SF-1-k}$) for spreading channel data on the control part. Then, a channel spreader 221 spreads data on the data channel DPDCH with the OVSF code for the data part and a channel spreader 222 spreads data on the control channel DPCCH with the OVSF code for the control part. The signals spread by the channel spreaders 221 and 222 are summed by a summer 223 and then multiplied by a scrambling code.

Figure 7:
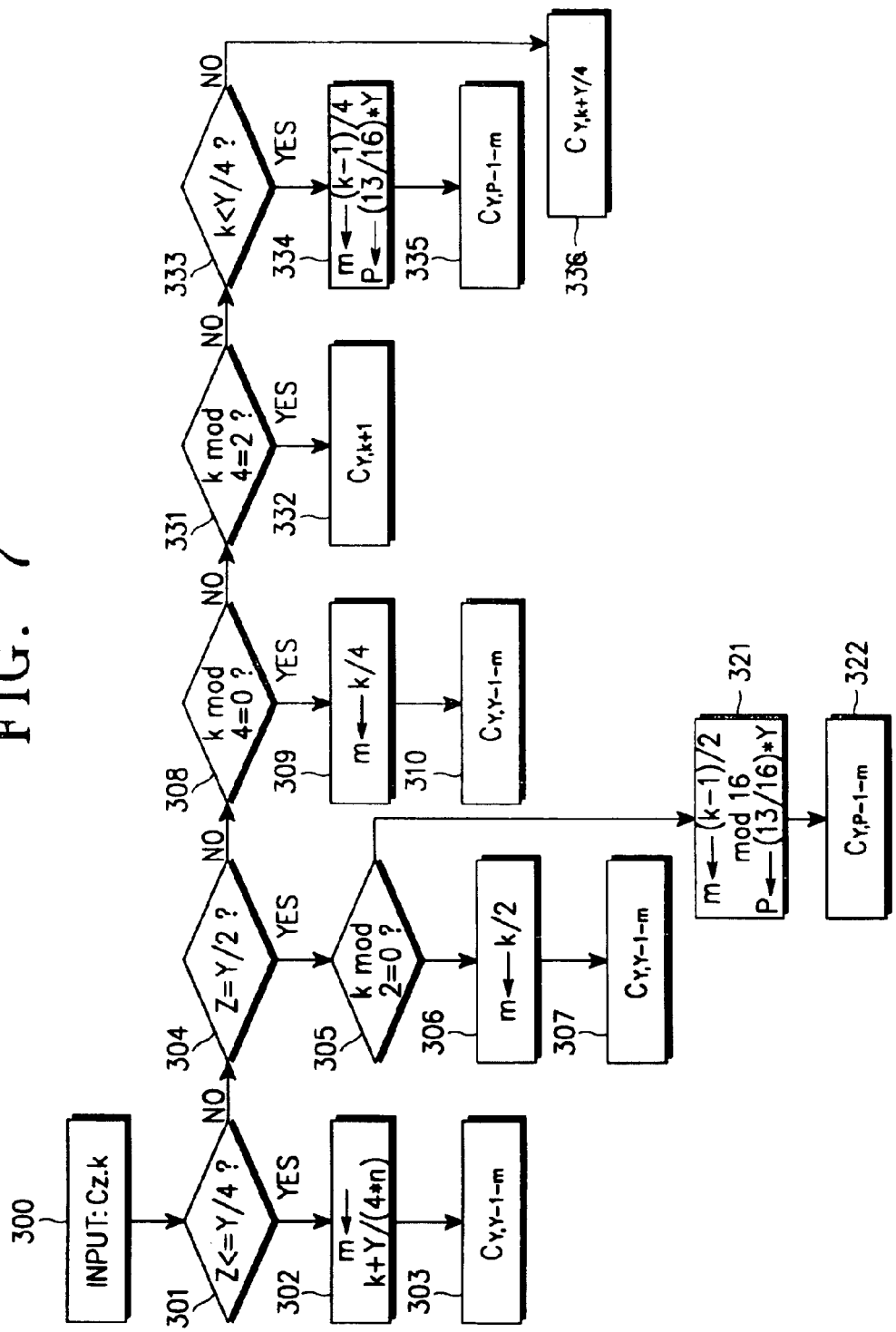
FIG. 7 is a flow chart illustrating a procedure for allocating an OVSF code in a CDMA communication system according to an embodiment of the present invention.

FIG. 7 shows a procedure for allocating an OVSF code in a CDMA communication system according to an embodiment of the present invention.

Referring to FIG. 7, in step 300, OVSF code node information $C_{Z,k}$ ($=C_{data,SF,k}$, that is, Z is SF of the data part) of the data part is received as an input value. Here, Z indicates a spreading factor (SF) of the data part and k indicates a code number in the OVSF code tree. It is determined in step 301 whether the SF value given in step 300 is equal to or smaller than Y/4. If the SF value is equal to or smaller than Y/4, the procedure proceeds to step 302, and otherwise, the procedure goes to step 304. Here, Y indicates an SF value of the control part. In step 302, a value m is calculated using Equation (5) below.

Equation (5)

$$m \leftarrow k*Y/(4*SF)$$

Thereafter, in step 303, a node $C_{Y,Y-1-m}$ ($C_{control,SF,SF-1-m}$, that is, Y is SF of the control part) is determined for the control part. It is determined in step 304 whether the Z value is equal to Y/2. If the Z value is equal to Y/2, the procedure proceeds to step 305, and otherwise, the procedure proceeds to step 308. In step 305, it is determined whether a remainder obtained by dividing the value k by 2 is 0 (i.e., whether k mod 2=0). If so, procedure goes to step 306, and otherwise, the procedure goes to step 321. In step 306, a value determined by dividing k by 2 is set to a value m. Thereafter, in step 307, $C_{Y,Y-1-m}$ is determined as an OVSF code for the control part. In step 321, a remainder obtained by dividing (k−1)/2 by 16 is set to a value m and a value (13/16)*Y is set to a value p. In step 322, $C_{Y,p-1-m}$ is determined for the control part.

In step 308, it is determined whether a value obtained by dividing the value k by 4 is 0 (i.e., whether k mod 4=0). If so, the procedure proceeds to step 309, and otherwise, the procedure proceeds to step 331. In step 309, a value obtained by dividing k by 4 is set to a value m. In step 310, $C_{Y,Y-1-m}$ is determined for the control part. In step 331, it is determined whether a value obtained by dividing k by 4 is 2 (i.e., whether k mod 4=2). If so, the procedure proceeds to step 332, and otherwise, the procedure proceeds to step 333. In step 332, $C_{Y,k+1}$ is determined for the data part. In step 333, it is determined whether k<Y/4. If so, the procedure goes to step 334, and otherwise, the procedure goes to step 336. In step 334, a value (k−1)/4 is to set to a value m and a value (13/16)*Y is set to a value p. Thereafter, in step 335, $C_{Y,p-1-m}$ is set for the control part. Meanwhile, in step 336, $C_{Y,k+Y/4}$ is set for the control part.

Third Embodiment

Next, a third embodiment of the present invention will be described. Since the UEs using the USTS (Uplink Synchronous Transmission Scheme) has a property of a low mobility, it is possible to limit the spreading factor (SF) to a specific value. Accordingly, in this embodiment, it is assumed that SF of the DPDCH (i.e., SF of the data part) in the UE employing one USTS is fixed to one value.

In this embodiment, SF=256 is allocated for the DPDCH (or control part) and one of SF=4, SF=8, SF=16, SF=32, SF=64, SF=128 and SF=256 is variably allocated for the DPDCH (or data part). First, the DPDCH defines mapping from the frontmost end in the OVSF tree architecture out of the nodes with the set SF, and then, the DPCCH defines mapping from the rearmost end in the OVSF tree architecture out of the SF=256 nodes. That is, a mapping function of F11($C_{data,SF,k}$)=$C_{control,256,255-k}$(0≤k≤11) is used. In this case, it is possible to know the maximum number of the allocable nodes in one OVSF code tree, and the description will be made for SF=4 and SF=64, by way of example.

(1) SF=4

In order not to lose the orthogonality of the OVSF code, $C_{4,0}$, $C_{4,1}$ and $C_{4,2}$ are allocated to the DPDCH, and $C_{256,255}$, $C_{256,254}$ and $C_{256,253}$ are allocated to the DPCCH to satisfy the mapping function F11($C_{data,4,k}$)=$C_{control,256,255-k}$ (0≤k≤3). When the OVSF codes are allocated as stated above, the maximum number of nodes which can be allocated while maintaining the orthogonality is 3.

(2) SF=64

In order to prevent the node allocated to the DPCCH from existing in the sub-tree of the node allocated to the DPDCH, it is possible to allocate a maximum of 51 nodes to the DPDCH and the DPCCH, respectively. That is, $C_{64,0}$, $C_{64,1}$, ..., $C_{64,50}$ are allocated to the DPDCH, and $C_{256,255}$, $C_{256,254}$, ..., $C_{256,205}$ are allocated to the DPCCH to satisfy a mapping function F11($C_{data,64,k}$)=$C_{control,256,255-k}$ (0≤k≤63). In a sub-tree of $C_{64,50}$, SF=256 nodes include $C_{256,196}$, $C_{256,197}$, $C_{256,198}$ and $C_{256,199}$, and in a sub-tree of $C_{64,51}$, SF=256 nodes include $C_{256,200}$, $C_{256,201}$, $C_{256,202}$ and $C_{256,203}$. Further, in a sub-tree of $C_{64,52}$, SF=256 nodes include $C_{256,204}$, $C_{256,205}$, $C_{256,206}$ and $C_{256,207}$. From this, all the nodes are allocated excepting the SF=64 node $C_{64,51}$ and its sub-tree's SF=256 nodes of $C_{256,200}$, $C_{256,201}$, $C_{256,202}$, and $C_{256,203}$. However, if it is assumed that the SF=64 node $C_{64,51}$ is allocated to another DPDCH, there will be no more nodes to be allocated to the DPCCH. Accordingly, the maximum number of the allocable nodes is 51.

The maximum number of the allocable OVSF nodes in one OVSF code tree for a set SF of the DPDCH can be determined by Rule 10 below.

$$\left(\frac{256}{SF}+1\right)x \leq 256 \qquad \text{<Rule 10>}$$

The maximum integer x satisfying Rule 10 is the maximum number of the OVSF nodes that the DPDCH with the above SF and the SF=256 DPCCH can be allocated. According to Rule 10, the maximum number of the OVSF code nodes allocable to the DPDCH and the DPCCH is 3 for the SF=4 DPDCH, 7 for the SF=8 DPDCH, 15 for the SF=16 DPDCH, 28 for the SF=32 DPDCH, 51 for the SF=64 DPDCH, 85 for the SF=128 DPDCH and 128 for the SF=256 DPDCH.

Fourth Embodiment

In this embodiment, a description will be made of a method for allocating a channelization code in the situation where the range of the scrambling code for the DPDCH is specified based on the foregoing rules.

First, in the situation where the range of the DPDCH scrambling code is specified, code allocation is performed based on the longest scrambling code. As described above, in the second embodiment of the present invention, code allocation was performed based on the case where SF is set to 64. That is, in the second embodiment, the description was made of the case where the SF=64 code allocated to the DPDCH and the SF=256 code allocated to the DPCCH were so mapped as to maintain the orthogonality. In the second embodiment, there exist unused OVSF codes when the OVSF code allocated to the data part has SF=128 and SF=256. Therefore, there was provided a method for allocating the unused OVSF codes in the second embodiment to the data part. In the fourth embodiment, a description will be made of a method for allocating the channelization codes based on the SF values other than SF=64.

(1) Method for Allocating Codes Based on SF=256

When the codes are allocated based on SF=256, SF of the OVSF code allocated to the DPDCH is defined as $4 \leq SF \leq 256$, and the code allocation method is identical to the method for maximally establishing the DPDCHs with SF=256. When the DPDCH can have SF=256, ½ of the OVSF code nodes are allocated for the DPDCH and the remaining ½ of the OVSF code nodes are allocated for the DPCCH. That is, ½ nodes on the OVSF code tree are classified into an OVSF code group for data to be allocated to the DPDCH, and the other ½ nodes on the OVSF code tree are classified into an OVSF code group for control to be allocated to the DPCCH. For example, the child nodes of the $C_{2,0}$ node, which are the upper ½ of the whole OVSF code tree, are allocated for the DPDCH, and the remaining child nodes of the $C_{2,1}$ node are allocated for the DPCCH. When one of the child nodes of the $C_{2,0}$ node is allocated to the DPDCH as an OVSF code, the DPCCH is allocated an OVSF code according to Rule 11 below.

<Rule 11>

$$F11(C_{data,256,k}) = C_{control,256,255-k} \text{ (for } 0 \leq k \leq SF/2-1)$$

If there exist p which satisfies (p*SF, p*k)=(256, n) for $SF \leq 256$, the nodes $C_{SF,k}$ and $C_{256,n}$ belong to the same group.

(2) Method for Allocating Codes Based on SF=128

When the codes are allocated based on SF=128, SF of the OVSF code allocated to the DPDCH is defined as $4 \leq SF \leq 128$, and the code allocation method is identical to the method for maximally establishing the DPDCHs with SF=128. When the codes are A allocated based on SF=128, a code allocation method is used in which the SF is fixed to 128 as described in the third embodiment of the present invention. That is, 85 SF=128 nodes of $C_{128,0}$–$C_{128,84}$ are allocated for the DPDCH, and 85 SF=256 nodes of $C_{256,171}$–$C_{256,255}$, which do not have the above nodes as their mother nodes, are allocated for the DPCCH. Here, the nodes which are mother nodes of the nodes allocated for the DPDCH but are not mother nodes of the nodes allocated for the DPCCH, can also be allocated for the DPDCH. When one of the above nodes is allocated to the DPDCH as an OVSF code, the DPCCH is allocated an OVSF code according to Rule 12 below.

<Rule 12>

$$F12(C_{data,128,k}) = C_{control,256,255-k} \text{ (for } 0 \leq k \leq [85*SF/128-1])$$

If there exist p which satisfies (p*SF, p*k)=(128, n) for $SF \leq 128$, the nodes $C_{SF,k}$ and $C_{128,n}$ belong to the same group. In addition, when an SF=256 OVSF code is allocated, the nodes $C_{256,2n}$ and $C_{128,n}$ belong to the same group and can be allocated to the same DPCCH, and the unused SF=256 OVSF codes can be applied and used as in the second embodiment.

(3) Method for Allocating Codes Based on SF=64

When the codes are allocated based on SF=64, SF of the OVSF code allocated to the DPDCH is defined as $4 \leq SF \leq 64$, and the code allocation method is identical to the method for maximally establishing the DPDCHs with SF=64. The SF is set to 64 by modifying the second embodiment of the present invention. That is, 51 SF=64 nodes of $C_{64,0}$–$C_{64,50}$ are allocated for the DPDCH, and 51 SF=256 nodes of $C_{256,204}$–$C_{256,255}$, which do not have the above nodes as their mother nodes, are allocated for the DPCCH. Of course, the nodes which are mother nodes of the nodes allocated for the DPDCH but are not mother nodes of the nodes allocated for the DPCCH, can also be allocated for the DPDCH. When one of the above nodes is allocated to the DPDCH as an OVSF code, the DPCCH is allocated an OVSF code according to Rule 13 below.

<Rule 13>

$$F13(C_{data,64,k}) = C_{control,256,255-k} \text{ (for } 0 \leq k \leq [51*SF/64-1])$$

If there exist p which satisfies (p*SF, p*k)=(64, n) for $SF \leq 64$, the nodes $C_{SF,k}$ and $C_{64,n}$ belong to the same group. Here, it is possible to allocate the SF=128 OVSF code and the SF=256 OVSF code to the DPCCH by modifying the second embodiment.

(4) Method for Allocating Codes Based on SF=32

When the codes are allocated based on SF=32, SF of the OVSF code allocated to the DPDCH is defined as $4 \leq SF \leq 32$, and the code allocation method is identical to the method for maximally establishing the DPDCHs with SF=32. A code allocation method is used in which the SF is fixed to 32 as described in the third embodiment of the present invention. That is, 28 SF=32 nodes of $C_{32,0}$–$C_{32,27}$ are allocated for the DPDCH, and 28 SF=256 nodes of $C_{256,227}$–$C_{256,255}$, which do not have the above nodes as their mother nodes, are allocated for the DPCCH. Of course, the nodes which are mother nodes of the nodes allocated for the DPDCH but are not mother nodes of the nodes allocated for the DPCCH, can also be allocated for the DPDCH. When one of the above nodes is allocated to the DPDCH as an OVSF code, the DPCCH is allocated an OVSF code according to Rule 14 below.

<Rule 14>

$$F14(C_{data,32,k}) = C_{control,256,255-k} \text{ (for } 0 \leq k \leq [28*SF/32-1])$$

If there exist p which satisfies (p*SF, p*k)=(32, n) for $SF \leq 32$, the nodes $C_{SF,k}$ and $C_{32,n}$ belong to the same group. In addition, it is possible to allocate the SF=128 OVSF code and the SF=256 OVSF code to the DPCCH as in the second embodiment.

(5) Method for Allocating Codes Based on $4 \leq SF \leq 16$

15 SF=16 nodes of $C_{16,0}$–$C_{16,14}$ are first allocated for the DPDCH, and then, 15 SF=256 nodes of $C_{256,241}$–$C_{256,255}$, which do not have the above nodes as their mother nodes, are allocated for the DPCCH. Of course, the nodes which are mother nodes of the nodes allocated for the DPDCH but are not mother nodes of the nodes allocated for the DPCCH, can also be allocated for the DPDCH. When one of the above nodes is allocated to the DPDCH as an OVSF code, the DPCCH is allocated an OVSF code according to Rule 15 below.

<Rule 15>

$$F15(C_{data,16,k}) = C_{control,256,255-k} \text{ (for } 0 \leq k \leq [15 * SF/16-1])$$

If there exist p which satisfies (p*SF, p*k)=(16, n) for SF≦16, the nodes $C_{SF,k}$ and $C_{16,n}$ belong to the same group. In addition, it is possible to allocate the SF=128 OVSF code and the SF=256 OVSF code to the DPCCH as in the second embodiment.

(6) Method for Allocating Codes Based on 4≦SF≦8

When the codes are allocated based on SF=32, SF of the OVSF code allocated to the DPDCH is defined as 4≦SF≦8, and the code allocation method is identical to the method for maximally establishing the DPDCHs with SF=8.

7 SF=8 nodes of $C_{8,0}$–$C_{8,6}$ are first allocated for the DPDCH, and then, 7 SF=256 nodes of $C_{256,249}$–$C_{256,255}$, which do not have the above nodes as their mother nodes, are allocated for the DPCCH. Of course, the nodes which are mother nodes of the nodes allocated for the DPDCH but are not mother nodes of the nodes allocated for the DPCCH, can also be allocated for the DPDCH. When one of the above nodes is allocated to the DPDCH as an OVSF code, the DPCCH is allocated an OVSF code according to Rule 16 below.

<Rule 16>

$$F16(C_{data,8,k}) = C_{control,256,255-k} \text{ (for } 0 \leq k \leq [7 * SF/8-1])$$

If there exist p which satisfies (p*SF, p*k)=(8, n) for SF≦8, the nodes $C_{SF,k}$ and $C_{8,n}$ belong to the same group. In addition, it is possible to allocate the SF=16, SF=64, SF=128 and SF=256 OVSF codes to the DPCCH as in the second embodiment.

Although the fourth embodiment of the present invention allocates the nodes with the larger code number on the OVSF code tree to the control part (i.e., DPCCH), the code numbers allocated to the DPCCH are not restricted. In addition, although the least allocable SF is assumed to be SF=4 in the fourth embodiment, the least allocable SF can be SF=8, SF=16, SF=32, SF=64, SF=128 or SF=256. In this case also, it is possible to obtain a corresponding relation by using the fourth embodiment. For example, when the least SF is 8, it is possible to obtain a corresponding relation for 8≦SF≦32 by using the case of 4≦SF≦32 described in the fourth embodiment.

Even in the USTS in which a plurality of UEs share the same scrambling code and are identified using the OVSF code which is a channelization code, one UE can use several DPDCHs. In this case, it is possible to allocate several OVSF codes to one UE.

However, from the viewpoint of effective OVSF code allocation, it is preferable to divide the DPDCH having twice the SF value of the above DPDCH into I and Q channels and then allocate the same OVSF code to the respective channels, rather than allocating one DPDCH to each UE. When the Q channel is not used, two OVSF codes having twice the SF value are allocated, so that each DPDCH can use one OVSF code. When several DPDCHs used by one UE have different SF values, the OVSF code of each SF value is allocated. Even when one UE uses several DPDCHs, only one DPCCH is used. In allocating the OVSF code for the DPCCH, an OVSF code for the DPCCH corresponding to the fastest one of the DPDCHs used by the UE is allocated by applying the second embodiment.

Fifth Embodiment

In the fifth embodiment, a description will be made of a method for allocating OVSF codes for the case where one UE with USTS uses two or more DPDCHs.

For example, one SF=8 OVSF code rather than one SF=4 OVSF code is allocated to the UE intended to use a service having a data rate of 960 Kbps, and the SF=8 DPDCH is divided into I and Q channels. If there is no sufficient SF-8 OVSF codes and there are sufficient SF=16 or SF=32 OVSF codes having different mother node (SF=8), then two SF=16 OVSF codes are allocated to the I and Q channels, respectively, to use a total of 4 DPDCHs. Alternatively, it is possible to use 8 DPDCHs to which 4 SF=32 OVSF codes are allocated as in the foregoing method. According to this method, it is possible to allocate the increased number of OVSF codes to the UEs.

In the fifth embodiment of the present invention, the OVSF codes can be allocated according to Rule 17, Rule 18, Rule 19 and Rule 20 below.

<Rule 17>

The UE intended to use an SF=256 DPDCH is allocated one SF=256 OVSF code.

<Rule 18>

The UE intended to use an SF=k (4=k≦128) DPDCH divides two SF=k*2 DPDCHs into the I and Q channels and equally uses the OVSF code in the respective channels, when there are allocable SF=k*2 OVSF codes left. When the Q channel is not used, a remaining SF=k OVSF code, if any, is used.

<Rule 19>

When there is no spare SF=k*2 OVSF code in Rule 18, the UE searches the maximal m value for the case where there remain $2^{m-1}$ SF=$2^m$ (SF=2) OVSF codes, and divides $2^m$ SF=k*m DPDCHs into the I and Q channels and equally uses the OVSF code in the respective channels. When the channel is separated using only the I channel, i.e., when the Q channel is not used, the UE searches the maximal m value for the case where there remain $2^{m-1}$ SF=$2^{m-1}$ (SF=2) OVSF codes, and uses the OVSF codes in $2^{m-1}$ SF=k*m DPDCHs, if there remains no SF=k OVSF code in Rule 18. When there exists no OVSF code satisfying this rule, entry of the present USTS group is refused.

<Rule 20>

Figure 1:
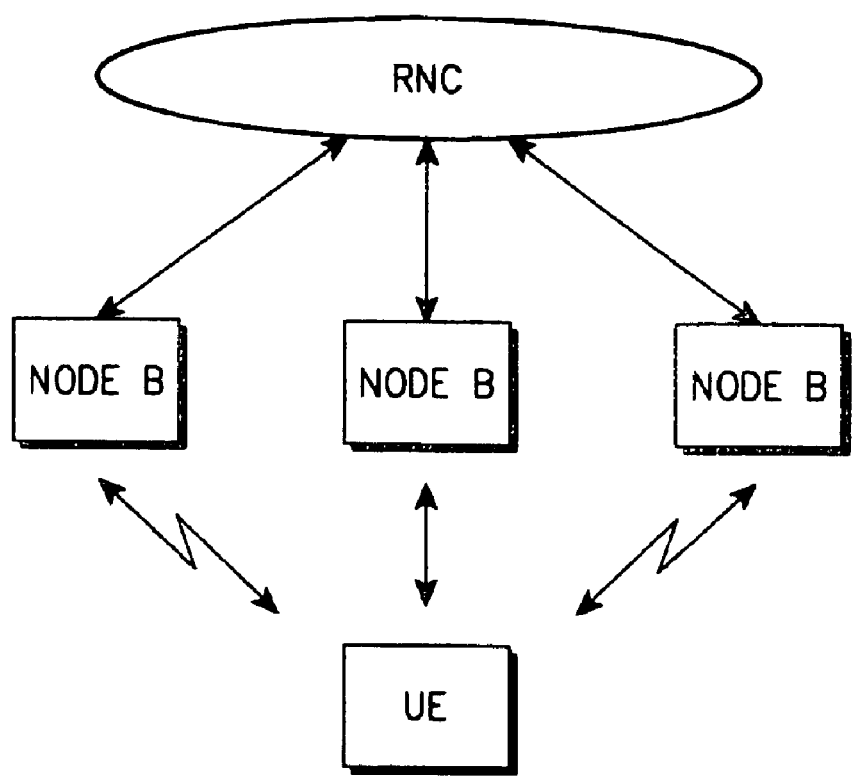
FIG. 1 is a diagram illustrating an architecture of an asynchronous W-CDMA communication system.
Figure 2:
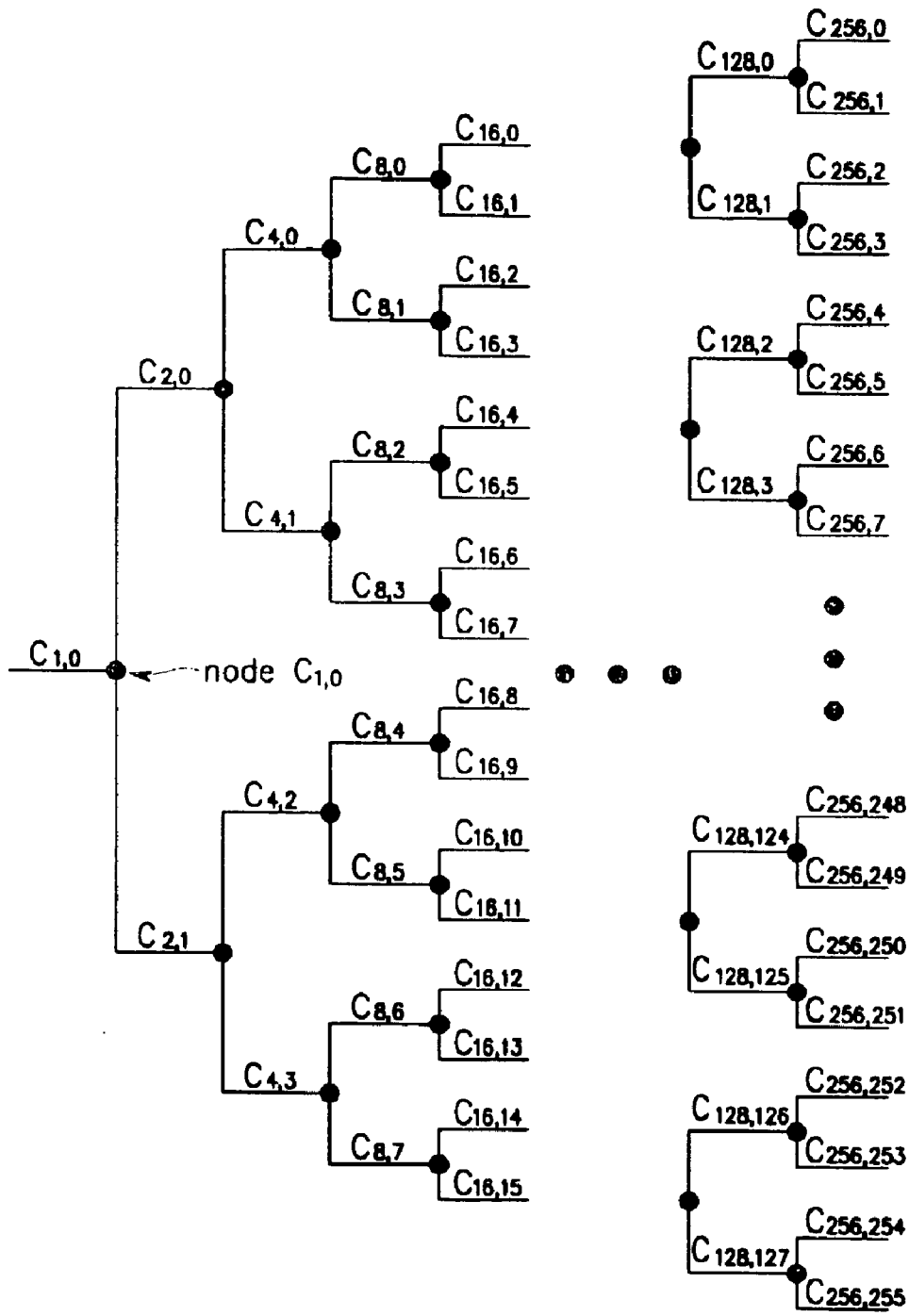
FIG. 2 is a diagram illustrating an OVSF code tree used in the W-CDMA communication system.
Figure 3:
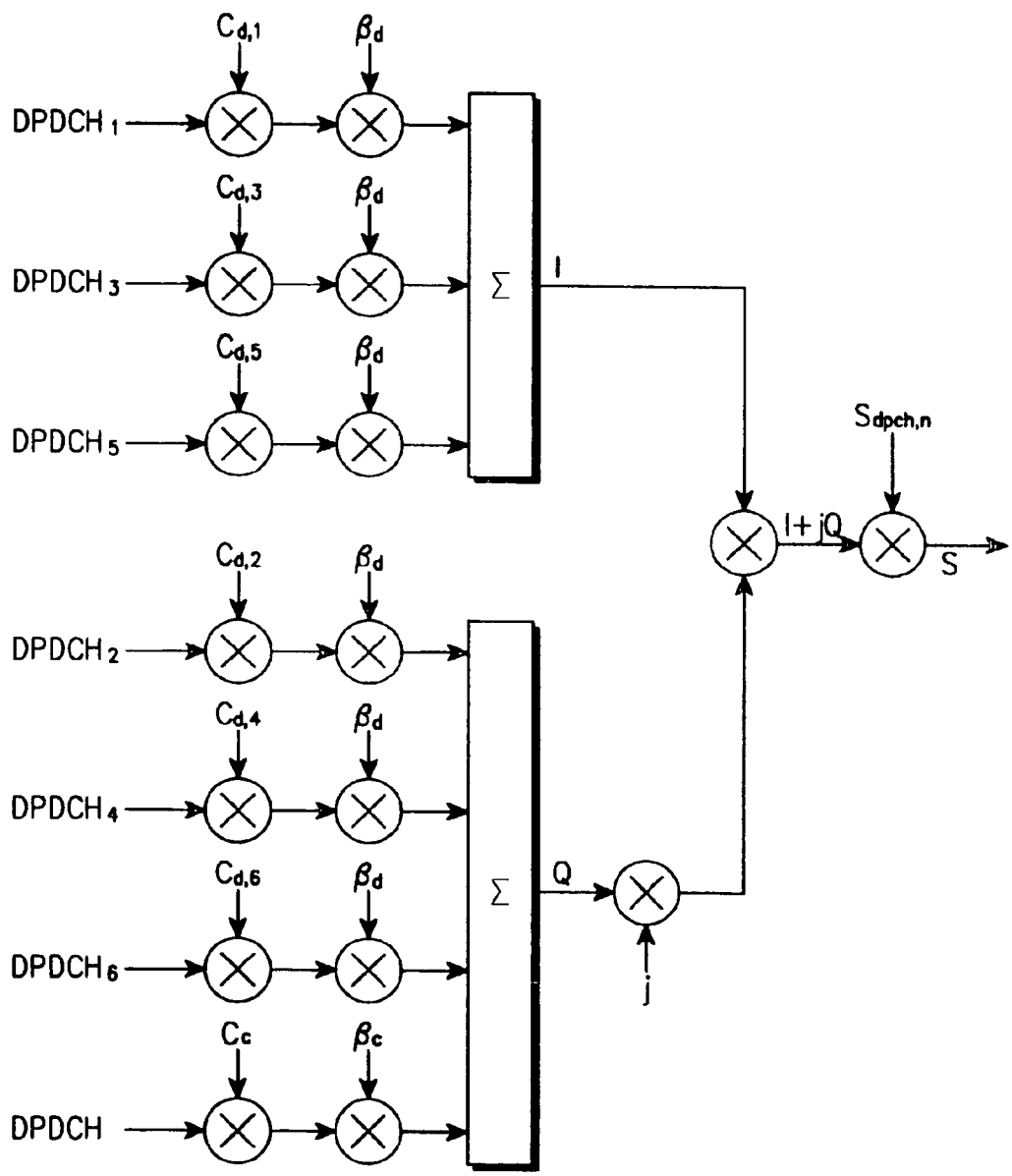
FIG. 3 is a diagram illustrating a scheme for spreading uplink dedicated physical data channel (DPDCH) and dedicated physical control channel (DPCCH) in the W-CDMA communication system.

A code corresponding to the fastest one of the OVSF codes allocated to the DPDCH, i.e., an OVSF code located at the frontmost end of the OVSF code tree shown in FIG. 2, is allocated for the SF=256 DPCCH. The DPCCH can be allocated using the channel allocation method described in the second embodiment.

For example, let's say that one UE intends to use a 960 Kbps DPDCH when the USTS which can use the I and Q channels are allocated the nodes $C_{4,0}$, $C_{8,2}$, $C_{8,5}$, $C_{16,6}$, and $C_{16,9}$ shown in FIG. 2. According to Rule 18, one SF=8 OVSF code is required, but there exists no remaining node. If the SF=16 OVSF code is searched according to Rule 19, it means that there exist spare codes $C_{16,7}$ and $C_{16,8}$. Those two codes are used for the DPDCHs of the two I and Q channels. That is, 4 DPDCHs are used. The DPCCH is AM allocated an OVSF code $C_{256,7}$ corresponding to the OVSF code $C_{16,7}$ in the second embodiment.

Sixth Embodiment

A sixth embodiment of the present invention will be described with reference to the second embodiment. In the second embodiment, the description was made of a method for allocating SF=256 OVSF code to the control part and allocating an OVSF code having SF=4, SF=8, SF=16, SF=32, SF=64, SF=128 and SF=256 to the data part. Further, the description was made of a method for using a sub-tree of a certain one of the SF=4 nodes for the control part. In the sixth embodiment of the present invention, a description will be made of the case where 2 SF=8 nodes are allocated to the control part, rather than allocating the SF=4 node to the control part as in the second embodiment. For convenience of explanation, it will be assumed herein that $C_{8,3}$ and $C_{8,7}$ out of 8 SF=8 nodes are allocated to the control part. Here, compared with the case where one SF=4 node is allocated to the control part, the case where two of the 8 SF=8 nodes are allocated to the control part can allocate a maximum of 2 SF=4 nodes, but has a better peak-to-average power ratio (PAPR). That is, it is possible to decrease the PAPR by separating the upper two SF=4 node trees and the lower two SF=4 node trees in the OVSF code tree and allocating the data part and the control part in the upper or lower node trees. Therefore, when two of the 8 SF=8 nodes are selectively used for the control part, it is preferable to select one from the upper node tree and the other one from the lower node tree, respectively, from the viewpoint of the PAPR.

The sixth embodiment uses the basic mapping concepts given by the following formulas. A description will be made of a method for receiving from the UTRAN one SF node $C_{SF,k}$ out of $2^{m-1}$ SF nodes (where m is an integer larger than 3) arranged in the trees having the mother node and the child nodes. Equation (6) below shows a process for searching a group including the received SF node $C_{SF,k}$, and Equation (7) below shows a basic, conceptional method for determining an OVSF code corresponding to the SF node according to the received SF node.

$$\text{For } SF \leq \frac{2^{m-1}}{4}, (P_1 \cdot SF, P_1 \cdot k) = \left(\frac{2^{m-1}}{4}, n\right) \quad \text{Equation (6)}$$

$$\text{For } SF > \frac{2^{m-1}}{4}, \left(P_2 \cdot \frac{2^{m-1}}{4}, P_2 \cdot n\right) = (SF, k)$$

$$\text{where, } P_1 = \frac{2^{m-1}}{4 \cdot SF} \text{ and } P_2 = \frac{4 \cdot SF}{2^{m-1}}.$$

$$F\left(C_{\frac{2^{m-1}}{4}, k}\right) = C_{2^{m-1}, 2^{m-1}-k-1} \ (k = 0, 1, \ldots) \quad \text{Equation (7)}$$

$$F\left(C_{\frac{2^{m-1}}{4}, k}\right) = C_{2^{m-1}, 2^{m-1}-(k-32)} \ (k = 0, 1, \ldots)$$

The sixth embodiment for allocating the two SF=8 nodes to the control part is modified from the second embodiment for basically allocating one SF=4 node to the control part. The sixth embodiment performs one-to-one mapping on the 48 SF=64 nodes and 48 SF=256 nodes for the data part according to Rule 21 below.

<Rule 21>

$$F21\text{-}1(C_{data,64,k}) = C_{control,256,127-k}$$

$$F21\text{-}2(C_{data,64,32+k}) = C_{control,256,255-k}$$

where k=0, 1, 2, 3 . . . , 23.

Rule 21 is modified from Rule 5, and the control part node for the data parts corresponding to the 48 SF=64 nodes is determined according to this mapping rule. The nodes which will share the same control part with the 48 SF=64 nodes are grouped according to Rule 22 below. Rule 22 is identical to Rule 6.

The data part nodes and the control part nodes according to the mapping rule of F21-1($C_{data,64,k}$)=$C_{control,256,127-k}$ (where k=0, 1, 2, 3, . . . , 23) in Rule 21 are given as shown in Table 5 below, and the data part nodes and the control part nodes according to the mapping rule of F21-2 ($C_{data,64,32+k}$)= $C_{control,256,255-k}$(where k=0, 1, 2, 3 . . . , 23) are given a shown in Table 6 below.

TABLE 5

| Data Part | | | | | Control Part |
|---|---|---|---|---|---|
| SF = 4 | SF = 8 | SF = 16 | SF = 32 | SF = 64 | (SF = 256) |
| $C_{4,0}$ | $C_{8,0}$ | $C_{16,0}$ | $C_{32,0}$ | $C_{64,0}$ | $C_{256,127}$ |
| | | | | $C_{64,1}$ | $C_{256,126}$ |
| | | | $C_{32,1}$ | $C_{64,2}$ | $C_{256,125}$ |
| | | | | $C_{64,3}$ | $C_{256,124}$ |
| | | $C_{16,1}$ | $C_{32,2}$ | $C_{64,4}$ | $C_{256,123}$ |
| | | | | $C_{64,5}$ | $C_{256,122}$ |
| | | | $C_{32,3}$ | $C_{64,6}$ | $C_{256,121}$ |
| | | | | $C_{64,7}$ | $C_{256,120}$ |
| | $C_{8,1}$ | $C_{16,2}$ | $C_{32,4}$ | $C_{64,8}$ | $C_{256,119}$ |
| | | | | $C_{64,9}$ | $C_{256,118}$ |
| | | | $C_{32,5}$ | $C_{64,10}$ | $C_{256,117}$ |
| | | | | $C_{64,11}$ | $C_{256,116}$ |
| | | $C_{16,3}$ | $C_{32,6}$ | $C_{64,12}$ | $C_{256,115}$ |
| | | | | $C_{64,13}$ | $C_{256,114}$ |
| | | | $C_{32,7}$ | $C_{64,14}$ | $C_{256,113}$ |
| | | | | $C_{64,15}$ | $C_{256,112}$ |
| $C_{4,1}$ | $C_{8,2}$ | $C_{16,4}$ | $C_{32,8}$ | $C_{64,16}$ | $C_{256,111}$ |
| | | | | $C_{64,17}$ | $C_{256,110}$ |
| | | | $C_{32,9}$ | $C_{64,18}$ | $C_{256,109}$ |
| | | | | $C_{64,19}$ | $C_{256,108}$ |
| | | $C_{16,5}$ | $C_{32,10}$ | $C_{64,20}$ | $C_{256,107}$ |
| | | | | $C_{64,21}$ | $C_{256,106}$ |
| | | | $C_{32,11}$ | $C_{64,22}$ | $C_{256,105}$ |
| | | | | $C_{64,23}$ | $C_{256,124}$ |

TABLE 6

| Data Part | | | | | Control Part |
|---|---|---|---|---|---|
| SF = 4 | SF = 8 | SF = 16 | SF = 32 | SF = 64 | (SF = 256) |
| $C_{4,2}$ | $C_{8,4}$ | $C_{16,8}$ | $C_{32,16}$ | $C_{64,32}$ | $C_{256,255}$ |
| | | | | $C_{64,33}$ | $C_{256,254}$ |
| | | | $C_{32,17}$ | $C_{64,34}$ | $C_{256,253}$ |
| | | | | $C_{64,35}$ | $C_{256,252}$ |
| | | $C_{16,9}$ | $C_{32,18}$ | $C_{64,36}$ | $C_{256,251}$ |
| | | | | $C_{64,37}$ | $C_{256,250}$ |
| | | | $C_{32,19}$ | $C_{64,38}$ | $C_{256,249}$ |
| | | | | $C_{64,39}$ | $C_{256,248}$ |
| | $C_{8,5}$ | $C_{16,10}$ | $C_{32,20}$ | $C_{64,40}$ | $C_{256,247}$ |
| | | | | $C_{64,41}$ | $C_{256,246}$ |
| | | | $C_{32,21}$ | $C_{64,42}$ | $C_{256,245}$ |
| | | | | $C_{64,43}$ | $C_{256,244}$ |
| | | $C_{16,11}$ | $C_{32,22}$ | $C_{64,44}$ | $C_{256,243}$ |
| | | | | $C_{64,45}$ | $C_{256,242}$ |
| | | | $C_{32,23}$ | $C_{64,46}$ | $C_{256,241}$ |
| | | | | $C_{64,47}$ | $C_{256,240}$ |
| $C_{4,3}$ | $C_{8,6}$ | $C_{16,12}$ | $C_{32,24}$ | $C_{64,48}$ | $C_{256,239}$ |
| | | | | $C_{64,49}$ | $C_{256,238}$ |
| | | | $C_{32,25}$ | $C_{64,50}$ | $C_{256,237}$ |
| | | | | $C_{64,51}$ | $C_{256,236}$ |
| | | $C_{16,13}$ | $C_{32,26}$ | $C_{64,52}$ | $C_{256,235}$ |
| | | | | $C_{64,53}$ | $C_{256,234}$ |
| | | | $C_{32,27}$ | $C_{64,54}$ | $C_{256,233}$ |
| | | | | $C_{64,55}$ | $C_{256,232}$ |

Table 5 and Table 6 show an example where the nodes are allocated to the control part according to the mapping rules of F($C_{data,64,k}$)=$C_{control,256,127-k}$ and F($C_{data,64,32+k}$)=$C_{control,256,255-k}$. However, when the nodes are allocated to the control part according to the mapping rules of F($C_{data,64,k}$)=$C_{control,256,96+k}$ and F($C_{data,64,32+k}$)=$C_{control,256,224+k}$, the nodes can be sequentially allocated from $C_{256,96}$ to $C_{256,111}$ and from $C_{256,224}$ to $C_{256,239}$, respectively. This can be expressed as follows.

$$F(C_{data,64,k}) = C_{control,256,96+k}$$

$$F(C_{data,64,32+k}) = C_{control,256,224+k}$$

where k=0, 1, 2, 3 . . . , 23.

In addition, the same result can be obtained even by properly setting the nodes allocated to the control part so as to be one-to-one mapped with the nodes allocated to the data part.

<Rule 22>

$$F22(C_{data,64,k}) = C_{control,256,255-k}$$

If there exists p which satisfies (p*SF, p*k)=(64, n) for SF≦64 or (p*64, p*n)=(SF, k) for SF>64 where 0≦n≦23, $C_{SF,K}$ and $C_{64,n}$ belong to one group. Here, 0≦k≦3*SF/8−1.

If there exists p which satisfies (p*SF, p*k)=(64, n) for SF≦64 or (p*64, p*n)=(SF, k) for SF≧64 where 32≦n≦55, $C_{SF,K}$ and $C_{64,n}$ belong to one group. Here, SF/2≦k≦(7*SF/8−1).

If there exists p which satisfies (p*SF, p*k)=(64, n) for SF≦64 or (p*64, p*n)=(SF, k) for SF>64, the nodes $C_{SF,K}$ and $C_{64,n}$ belong to one group.

When the mapping method according to Rule 22 is used, the control part node for the nodes allocated to the data part is determined for 4≦SF≦64, and it is possible to simultaneously allocate 3*SF/4 data part nodes per SF. In Rule 22, a mapping rule is required for SF=128 nodes $C_{128,k}$ (where k is the odd number) and the SF=256 nodes $C_{256,k}$ (where k is not a multiple of 4). Typical examples are given below (1) for SF=128 and (2) for SF=256.

(1) SF=128

The 8 nodes $C_{256,96}$, $C_{256,97}$, $C_{256,98}$, $C_{256,99}$, $C_{256,100}$, $C_{256,101}$, $C_{256,102}$, $C_{256,103}$ out of the SF=256 nodes in the sub-tree of the node $C_{8,3}$, shown in FIG. 4, and the 8 nodes $C_{256,200}$, $C_{256,201}$, $C_{256,202}$, $C_{256,203}$, $C_{256,204}$, $C_{256,205}$, $C_{256,206}$, $C_{256,207}$ out of SF=256 nodes in the sub-tree of the node $C_{8,7}$ are not used. Therefore, these nodes can be allocated for the control part of the SF=128 nodes $C_{128,k}$ (where k is the odd number). For example, it is possible to apply a multiple-to-one function mapping method between the 48 SF=128 nodes and 16 SF=256 control part nodes, as given by Rule 23 and Rule 24 below.

<Rule 23>

$$F23(C_{data,128,2n+1}) = F23(C_{data,128,2(n+8)+1}) = F23(C_{data,128,2(n+16)+1}) =$$
$$C_{control,256,103-n},$$

(for 0≦n≦7)

$$F23(C_{data,128,64+2n+1}) = F23(C_{data,128,64+2(n+8)+1}) = F23$$
$$(C_{data,128,64+2(n+16)+1}) = C_{control,256,207-n}, \text{ (for } 0 \leq n \leq 7)$$

Therefore, when the additional mapping rule of Rule 23 is used, the SF=128 data part nodes $C_{data,128,k}$ (where k is the odd number) shown in Table 7 and Table 8 below are allocated to the non-allocated control part nodes of $C_{256,96}$, $C_{256,97}$, $C_{256,98}$, $C_{256,99}$, $C_{256,100}$, $C_{256,101}$, $C_{256,102}$, $C_{256,103}$ and $C_{256,200}$, $C_{256,201}$, $C_{256,202}$, $C_{256,203}$, $C_{256,204}$, $C_{256,205}$, $C_{256,206}$, $C_{256,207}$.

TABLE 7

| n | Data Part | | | Control Part |
|---|---|---|---|---|
| | F7($C_{data,128,2n+1}$) | F7($C_{data,128,2(n+8)+1}$) | F7($C_{data,128,2(n+16)+1}$) | $C_{control,256,103-n}$ |
| n = 0 | $C_{128,1}$ | $C_{128,17}$ | $C_{128,33}$ | $C_{256,103}$ |
| n = 1 | $C_{128,3}$ | $C_{128,19}$ | $C_{128,35}$ | $C_{256,102}$ |
| n = 2 | $C_{128,5}$ | $C_{128,21}$ | $C_{128,37}$ | $C_{256,101}$ |
| n = 3 | $C_{128,7}$ | $C_{128,23}$ | $C_{128,39}$ | $C_{256,100}$ |
| n = 4 | $C_{128,9}$ | $C_{128,25}$ | $C_{128,41}$ | $C_{256,99}$ |
| n = 5 | $C_{128,11}$ | $C_{128,27}$ | $C_{128,43}$ | $C_{256,98}$ |
| n = 6 | $C_{128,13}$ | $C_{128,29}$ | $C_{128,45}$ | $C_{256,97}$ |
| n = 7 | $C_{128,15}$ | $C_{128,31}$ | $C_{128,47}$ | $C_{256,96}$ |

TABLE 8

| n | Data Part | | | Control Part |
|---|---|---|---|---|
| | F7($C_{data,128,64+2n+1}$) | F7($C_{data,128,64+2(n+8)+1}$) | F7($C_{data,128,64+2(n+16)+1}$) | $C_{control,256,207-n}$ |
| n = 0 | $C_{128,65}$ | $C_{128,81}$ | $C_{128,97}$ | $C_{256,207}$ |
| n = 1 | $C_{128,67}$ | $C_{128,83}$ | $C_{128,99}$ | $C_{256,206}$ |
| n = 2 | $C_{128,69}$ | $C_{128,85}$ | $C_{128,101}$ | $C_{256,205}$ |
| n = 3 | $C_{128,71}$ | $C_{128,87}$ | $C_{128,103}$ | $C_{256,204}$ |
| n = 4 | $C_{128,73}$ | $C_{128,89}$ | $C_{128,105}$ | $C_{256,203}$ |
| n = 5 | $C_{128,75}$ | $C_{128,91}$ | $C_{128,107}$ | $C_{256,202}$ |
| n = 6 | $C_{128,77}$ | $C_{128,93}$ | $C_{128,109}$ | $C_{256,201}$ |
| n = 7 | $C_{128,79}$ | $C_{128,95}$ | $C_{128,111}$ | $C_{256,200}$ |

<Rule 24>

$$F24(C_{data,256,4n+2}) = C_{control,256,4n+3} \text{ (for } 0 \leq n \leq 47)$$

In addition, when a remainder obtained by dividing k by 4 is 1 (i.e., k=4n+1), there exist a total of 48 nodes. Those 48 nodes are allocated to the data part and the control part according to Rule 25 below.

<Rule 25>

$$F25\text{-}1(C_{data,256,4n+1}) = C_{control,256,207-n} \text{ (for } 0 \leq n \leq 15)$$

$$F25\text{-}2(C_{data,256,4(n+16)+1}) = C_{control,256,4n+1} \text{ (for } 0 \leq n \leq 15)$$

(2) SF=256

The mapping rule for SF=256 is divided into the following two cases according to a remainder obtained by dividing k in $C_{256,k}$ by 4. In the first case, when k in the node $C_{256,k}$ is a multiple of 4, this node is determined as a node for the control part according to Rule 21. In the second case, when a remainder obtained by dividing k by 4 is 2 (i.e., k=4n+2)

and is 3 (i.e., k=4n+3), a node for the case where the remainder obtained by dividing k by 4 is 2 is set for the data part, and a node for the case where the remainder obtained by dividing k by 4 is 3 is set for the control part, respectively. Here, by modifying Rule 24 and Rule 25, it is possible to associate all the remaining SF=256 nodes with the control part. That is, by using the mapping rules, it is possible to simultaneously allocate two nodes for SF=4, ¾ the total nodes with respect to each SF for 4≦SF≦16, and ½ the total nodes with respect to each SF for SF=256 as in the prior art.

Accordingly, in the sixth embodiment, the UTRAN can allocate one of OVSF code nodes $C_{data,SF,k}$, defined in Equation (8), in one scrambling code to the UE.

$$C_{data,SF,k}$$

$$\text{where } k = \begin{cases} 0, 1, 2, \ldots, \frac{3}{8}*SF-1, \frac{SF}{2}, \frac{SF}{2}+1, \ldots, \frac{7}{8}*SF-1 \text{ if } SF \leq 64 \\ 0, 2, 4, \ldots, 46, 64, 66, \ldots, 110 \text{ if } SF = 128 \\ 0, 4, 8, \ldots, 92, 1128, 132, \ldots, 220 \text{ if } SF = 256 \end{cases}$$

Equation (8)

In Equation (8), one of 4, 8, 16, 32, 64, 128 and 256 is selectively determined as the SF value. The UE, being allocated the OVSF code node by the UTRAN according to Equation (8), can use the upper branch nodes having the higher SF values in the sub-code tree. For example, the UE, when allocated an OVSF code node $C_{data,8,1}$, can use the SF>8 upper branch nodes in the sub-code tree, i.e., the codes $C_{data,16,2}$, $C_{data,32,4}$, $C_{data,64,8}$, $C_{data,128,16}$, $C_{data,256,32}$. Being allocated a code $C_{data,SF,k}$ for the DPDCH, the UE transmits the DPCCH using a $C_{control,256,127-n}$ node when the DPDCH code belongs to the upper node tree and a $C_{control,256,255-n}$ node when the DPDCH code belongs to the lower node tree according to the above mapping rule. In the node $C_{control,256,255-n}$, the value n is determined by Equation (9) below.

Equation (9)

$$n=k*64/SF$$

The mapping for SF=128 nodes and SF=256 nodes, excluded from Equation (9), is performed according to the above mapping rules, and the sixth embodiment has been described for the case where two SF=8 nodes are allocated to the control part.

Therefore, by applying the second and sixth embodiments of the present invention, it is possible to perform mapping on one case where 4 SF=16 nodes are allocated to the control part and another case where 8 SF=32 nodes are allocated to the control part.

With reference to the fifth embodiment, a description will be made of a method of the sixth embodiment for allocating a channelization code in the situation where the range of a scrambling code for the DPDCH is specified, on the assumption that the 2 SF=8 nodes are allocated to the control part based on the above rules.

The maximum number of the allocable OVSF nodes in one OVSF code tree for a given SF of the DPDCH can be determined by Rule 26 below.

$$\left(\frac{256}{SF}+1\right)x \leq 128 \qquad \text{<Rule 26>}$$

The maximum integer x which satisfies Rule 26 is the maximum number of the OVSF nodes which the DPDCH having the above SF value and the SF=256 DPDCH can be allocated, when two SF=8 nodes are allocated to the control part. According to Rule 26, the maximum number of the OVSF code nodes allocable to the DPDCH and the DPCCH is 1 for the SF=4 DPDCH, 3 for the SF=8 DPDCH, 7 for the SF=16 DPDCH, 14 for SF=32 DPDCH, 25 for the SF=64 DPDCH, 42 for the SF=128 DPDCH, and 64 for the SF=256 DPDCH.

The rules used in the fifth embodiment will be changed to the following rules in the sixth embodiment.

Rule 27 below shows a method for allocating codes based on SF=256.

<Rule 27>

$$F27(C_{data,256,k})=C_{control,256,127-k} \text{ (for } 0 \leq k \leq SF/4-1)$$

$$F27(C_{data,256,k})=C_{control,256,255-k} \text{ (for } SF/2 \leq k \leq SF*\tfrac{3}{4}-1)$$

Rule 28 below shows a method for allocating codes based on SF=128.

<Rule 28>

$$F28(C_{data,128,k})=C_{control,256,127-k} \text{ (for } 0 \leq k \leq [42*SF/128-1])$$

$$F28(C_{data,128,k})=C_{control,256,255-k} \text{ (for } SF/2 \leq k \leq [106*SF/128-1])$$

Rule 29 below shows a method for allocating codes based on SF=64.

<Rule 29>

$$F29(C_{data,64,k})=C_{control,256,127-k} \text{ (for } 0 \leq k \leq [25*SF/64-1])$$

$$F29(C_{data,64,k})=C_{control,256,255-k} \text{ (for } SF/2 \leq k \leq [57*SF/64-1])$$

Rule 30 below shows a method for allocating codes based on SF=32.

<Rule 30>

$$F30(C_{data,32,k})=C_{control,256,127-k} \text{ (for } 0 \leq k \leq [14*SF/32-1])$$

$$F30(C_{data,32,k})=C_{control,256,255-k} \text{ (for } SF/2 \leq k \leq [30*SF/32-1])$$

Rule 31 below shows a method for allocating codes based on SF=16.

<Rule 31>

$$F31(C_{data,16,k})=C_{control,256,127-k} \text{ (for } 0 \leq k \leq [7*SF/16-1])$$

$$F31(C_{data,16,k})=C_{contro1,256,255-k} \text{ (for } SF/2 \leq k \leq [16*SF/16-1])$$

Rule 32 below shows a method for allocating codes based on SF=8.

<Rule 32>

$$F32(C_{data,8,k})=C_{control,256,127-k} \text{ (for } 0 \leq k \leq [3*SF/8-1])$$

$$F32(C_{data,8,k})=C_{control,256,255-k} \text{ (for } SF/2 \leq k \leq [7*SF/8-1])$$

As described above, the present invention allocates the OVSF codes to a plurality of UEs employing the USTS by separating the data part of the DPDCH and the control part of the DPCCH, so as to increase utilization efficiency of the OVSF codes, thus contributing to an increase in the system capacity.

Further, the present invention, when there exists no SF having a desired data rate, allocates SF which is N times the above SF and transmits data through several channels, so as to efficiently use the limited OVSF codes, thus contributing to an increase in the system capacity.

Moreover, in a channel where there exist a data part and a control part in a pair, the control part is fixedly allocated a specific SF and the data part is variably allocated the SF, to thereby increase the number of allocable OVSF codes while maintaining the orthogonality, resulting in an increase in the system capacity.

In addition, the UTRAN can actively allocate the DPCH channels in the USTS group.

Further, in the channel where there exist the data part and the control part in a pair, the OVSF codes allocated to the control part and the OVSF codes allocated to the data part are separately grouped to select the OVSF codes allocated to the control part and the data part from the nodes belonging to the different groups, thereby increasing the peak-to-average power ratio.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel allocation method in a CDMA (Code Division Multiple Access) communication system, comprising the steps of:

receiving from a UTRAN (UMTS (Universal Mobile Terrestrial System) Terrestrial Radio Access Network) one SF (Spreading Factor) node $C_{SF,k}$ out of $2^{m-1}$ SF nodes (where m is an integer larger than 3) arranged in the form of a tree having a mother node and child nodes;

searching a group including the received SF node $C_{SF,k}$ in accordance with $$\text{For } SF \leq \frac{2^{m-1}}{4}, (P_1 \cdot SF, P_1 \cdot k) = \left(\frac{2^{m-1}}{4}, n\right)$$

$$\text{For } SF > \frac{2^{m-1}}{4}, \left(P_2 \cdot \frac{2^{m-1}}{4}, P_2 \cdot n\right) = (SF, k)$$

where, $P_1 = \frac{2^{m-1}}{4 \cdot SF}$ and $P_2 = \frac{4 \cdot SF}{2^{m-1}}$;

spreading a signal on a dedicated physical data channel (DPDCH) with an OVSF (Orthogonal Variable Spreading Factor) code corresponding to a selected one of the received SF node and its child nodes in the searched group; and spreading a signal on a dedicated physical control channel (DPCCH) with an OVSF code corresponding to an SF node determined by $$F\left(C_{\frac{2^{m-1}}{4},k}\right) = C_{2^{m-1}, 2^{m-1}-k-1} (k = 0, 1, \ldots)$$

if the n of the received SF node is the first half value having $(2^m-1)/4$ and $$F\left(C_{\frac{2^{m-1}}{4},k}\right) = C_{2^{m-1}, 2^{m-1}-(k-32)} (k = 0, 1, \ldots)$$

if the n thereof is the latter half value halving the same.

2. The channel allocation method as claimed in claim 1, wherein if a spreading factor in the SF node $C_{SF,k}$ is SF=64 and an associated spreading factor for a control part is SF=256, a spreading factor $C_{control,256,127-k}$ of the DPCCH is mapped to a spreading factor $C_{data,64,k}$ of the DPDCH, and a spreading factor $C_{control,256,255-k}$ of the DPCCH is mapped to a spreading factor $C_{data,64,32+k}$ of the DPDCH in accordance with:

$$F(C_{data,64,k}) = C_{control,256,127-k}$$

$$F(C_{data,64,32+k}) = C_{control,256,255-k}$$

where k=0, 1, 2, 3, ..., 23.

3. The channel allocation method as claimed in claim 1, wherein if a spreading factor in the SF node $C_{SF,k}$ is SF=64 and an associated spreading factor for a control part is SF=256, a spreading factor $C_{control,256,96+k}$ of the DPCCH is mapped to a spreading factor $C_{data,64,k}$ of the DPDCH, and a spreading factor $C_{control,256,224+k}$ of the DPCCH is mapped to a spreading factor $C_{data,64,32+k}$ of the DPDCH in accordance with:

$$F(C_{data,64,k}) = C_{control,256,96+k}$$

$$F(C_{data,64,32+k}) = C_{control,256,224+k}$$

where k=0, 1, 2, 3, ..., 23.

4. The channel allocation method as claimed in claim 1, wherein in the case where a spreading factor in the SF node $C_{SF,k}$ is SF=128 and an associated spreading factor for a control part is SF=256, when k in a spreading factor $C_{data,128,k}$ of the DPDCH is an even number, a spreading factor of the DPCCH is mapped according to $F(C_{data,128,k}) = C_{control,256,127-k}$; when the k is an odd number, the spreading factor of the DPCCH is mapped according to $F7(C_{data,128,2n+1}) = F7(C_{data,128,2(n+8)+1}) = F7(C_{data,128,2(n+16)+1}) = C_{control,256,103-n}$, (for $0 \leq n \leq 7$); when k in a spreading factor $C_{data,64,32+k}$ of the DPDCH is an even number, the spreading factor of the DPCCH is mapped according to $F(C_{data,128,64+k}) = C_{control,256,255-k}$; and when the k is an odd number, the spreading factor of the DPCCH is mapped according to $$F7(C_{data,128,64,+2n+1}) = F7(C_{data,128,64+2(n+8)+1}) = F7(C_{data,128,64+2(n+16)+1}) = C_{control,256,207-n}, \text{ (for } 0 \leq n \leq 7\text{), where } k=0, 1, 2, 3, \ldots, 23.$$

5. An uplink channel transmission apparatus for a user equipment (UE) in a CDMA communication system, comprising:

a memory for storing $2^{m-1}$ SF nodes (where m is an integer larger than 3) arranged in the form of a tree having a mother node and child nodes;

an input unit for receiving one SF node $C_{SF,k}$ from a UTRAN;

an OVSF code allocating device for searching a group including the received SF node $C_{SF,k}$ according to $$\text{For } SF \leq \frac{2^{m-1}}{4}, (P_1 \cdot SF, P_1 \cdot k) = \left(\frac{2^{m-1}}{4}, n\right)$$

$$\frac{2^{m-1}}{4} \text{For } SF > \frac{2^{m-1}}{4}, \left(P_2 \cdot \frac{2^{m-1}}{4}, P_2 \cdot n\right) = (SF, k)$$

where, $P_1 = \frac{2^{m-1}}{4 \cdot SF}$ and $P_2 = \frac{4 \cdot SF}{2^{m-1}}$, selecting one node for a data part out of the receivedSF node and associated child nodes from the searched group, and selecting an SF node for a control part determined by $$F\left(C_{\frac{2^{m-1}}{4}\cdot k}\right) = C_{2^{m-1},2^{m-1}-k-1} \quad (k = 0, 1, \ldots)$$

if the n of the received SF node is the first half value halving $(2^m-1)/4$ and $$F\left(C_{\frac{2^{m-1}}{4}\cdot k}\right) = C_{2^{m-1},2^{m-1}-(k-32)} \quad (k = 0, 1, \ldots)$$

if the n thereof is the latter half value halving the same;

an OVSF code generator for generating OVSF codes for a DPDHC and a DPCCH corresponding to the selected SF nodes of the data part and the control part;

a DPDCH spreader for spreading a signal on the DPDCH with the generated OVSF code for the data part; and a DPCCH spreader for spreading a signal on the DPCCH with the generated OVSF code for the control part.

6. The uplink channel transmission apparatus as claimed in claim 5, wherein if a spreading factor in the SF node $C_{SF,k}$ is SF=64 and an associated spreading factor for the control part is SF=256, a spreading factor $C_{control,256,255-k}$ of the DPCCH is mapped to a spreading factor $C_{data,64,k}$ of the DPDCH, and a spreading factor $C_{control,256,255-k}$ of the DPCCH is mapped to a spreading factor $C_{data,64,32+k}$ of the DPDCH in accordance with:

$$F(C_{data,64,k})=C_{control,256,127-k}$$

$$F(C_{data,64,32+k})=C_{control,256,255-k}$$

where k=0, 1, 2, 3, . . . , 23.

7. The uplink channel transmission apparatus as claimed in claim 5, wherein in the case where a spreading factor in the SF node $C_{SF,k}$ is SF=128 and an associated spreading factor for the control part is SF=256, when k in a spreading factor $C_{data,128,k}$ of the DPDCH is an even number, a spreading factor of the DPCCH is apped according to $F(C_{data,128,k})=C_{control,256,127-k}$; when k is an odd number, the spreading factor of the DPCCH is mapped according to $F7(C_{data,128,2n+1}) = F7(C_{data,128,2(n+8)+1}) = F7(C_{data,128,2(n+16)+1})=C_{control,256,103-n}$, (for $0\leq n\leq 7$); when k in the spreading factor $C_{data,64,32+k}$ of the DPDCH is an even number, the spreading factor of the DPCCH is mapped according to $F(C_{data,128,64+k})=C_{control,256,255-k}$; and when k is an odd number, the spreading factor of the DPCCH is mapped according to $$F7(C_{data,128,64+2n+1})=F7(C_{data,128,64+2(n+8)+1})=F7(C_{data,128,64+2(n+16)+1})=C_{control,256,207-n}, \text{ (for } 0\leq n\leq 7\text{), where } k=0, 1, 2, 3, \ldots, 23.$$

8. An uplink channel transmission apparatus for a UTRAN in a CDMA communication system, comprising:

a memory for storing $2^{m-1}$ SF nodes (where m is an integer larger than 3) arranged in the form of a tree having a mother node and child nodes;

an input unit for receiving one SF node $C_{SF,k}$ from a UE;

an OVSF code allocating device for searching a group including the received SF node $C_{SF,k}$ according to $$\text{For } SF \leq \frac{2^{m-1}}{4}, (P_1 \cdot SF, P_1 \cdot k) = \left(\frac{2^{m-1}}{4}, n\right)$$

$$\text{For } SF > \frac{2^{m-1}}{4}, \left(P_2 \cdot \frac{2^{m-1}}{4}, P_2 \cdot n\right) = (SF, k)$$

where, $P_1 = \frac{2^{m-1}}{4 \cdot SF}$ and $P_2 = \frac{4 \cdot SF}{2^{m-1}}$, selecting one node for a data part out of the received SF node and associated child nodes from the searched group, and selecting an SF node for a control part determined by $$F\left(C_{\frac{2^{m-1}}{4}\cdot k}\right) = C_{2^{m-1},2^{m-1}-k-1} \quad (k = 0, 1, \ldots)$$

if the n of the received SF node is the first half value halving $(2^m-1)/4$ and $$F\left(C_{\frac{2^{m-1}}{4}\cdot k}\right) = C_{2^{m-1},2^{m-1}-(k-32)} \quad (k = 0, 1, \ldots)$$

if the n thereof is the latter half value halving the same;

an OVSF code generator for generating OVSF codes for a DPDCH and a DPCCH corresponding to the selected SF nodes of the data part and the control part;

a DPDCH despreader for despreading a signal on the DPDCH with the generated OVSF code for the data part; and a DPCCH despreader for despreading a signal on the DPCCH with the generated OVSF code for the control part.

9. A method for assigning a first OVSF code and a second OVSF code which respectively spread data signals and control signals, in a mobile communication system having an OVSF code wherein $2^m-1$ SF nodes are arranged in the form of a tree in m+1 column and the SF nodes are divided into a pair of trees having first and second half SF nodes obtained by halving first SF nodes in a column corresponding to a maximum SF, the method comprising the steps of:

each tree allocating an OVSF code corresponding to one of some SF nodes in anm+1 column which becomes child nodes of one node out of second SF nodes following the first SF nodes as the first OVSF code for spreading a control signal; and allocating the second OVSF code corresponding to one of the remaining nodes which maintain orthogonality with said one of the second SF nodes to spread a data signal;

wherein the maximum SF node is $C_{4,k}$ (where k=0, 1, 2, 3), the first SF nodes include $C_{4,0}$ and $C_{4,2}$, the second SF nodes include $C_{4,1}$ and $C_{4,3}$, the second SF node $C_{4,1}$ includes child nodes $C_{8,2}$ and $C_{8,3}$, the second SF node $C_{4,3}$ includes child nodes $C_{8,6}$ and $C_{8,7}$, the child nodes $C_{8,3}$ and $C_{8,7}$ are allocated as the second OVSF code for spreading the control signal, and the remaining nodes are allocated as the first OVSF code for spreading the data signal; and wherein the first OVSF codes for spreading the data signal and the second OVSF codes for spreading the control signal are so allocated as to be mapped according to:

$$F(C_{data,64,k})=C_{control,256,127-k}$$

$$F(C_{data,64,32+k})=C_{control,256,255-k}$$

where a spreading factor of the data signal is SF=64, a spreading factor of the control signal is SF=256, and k=0, 1, 2, 3, . . . , 23.

10. A method for assigning a first OVSF (Orthogonal Variable Spreading Factor) code and a second OVSF code which respectively spread data signals and control signals, in a mobile communication system having an OVSF code wherein $2^m-1$ SF (Spreading Factor) nodes are arranged in the form of a tree in m+1 column and the SF nodes are divided into a pair of trees having first and second half SF nodes obtained by halving first SF nodes in a column corresponding to a maximum SF, the method comprising the steps of:

each tree allocating an OVSF code corresponding to one of some SF nodes in an m+1$^{th}$ column which becomes child nodes of one node out of second SF nodes following the first SF nodes as the first OVSF code for spreading a control signal; and allocating the second OVSF code corresponding to one of the remaining nodes which maintain orthogonality with said one of the second SF nodes to spread a data signal;

wherein the maximum SF node is $C_{4,k}$ (where k=0, 1, 2, 3), the first SF nodes include $C_{4,0}$ and $C_{4,2}$, the second SF nodes include $C_{4,i}$, and $C_{4,3}$, the second SF node $C_{4,1}$ includes child nodes $C_{8,2}$ and $C_{8,3}$, the second SF node $C_{4,3}$ includes child nodes $C_{8,6}$ and $C_{8,7}$, the child nodes $C_{8,3}$ and $C_{8,7}$, are allocated as the second OVSF code for spreading the control signal, and the remaining nodes are allocated as the first OVSF code for spreading the data signal; and wherein when k is an even number, the first OVSF codes for spreading the data signal and the second OVSF codes for spreading the control signal are mapped according to $F(C_{data,128,k})=C_{control,256,127-k}$ and $F(C_{data,128,64+k})=C_{control,256,255-k}$, and when k is an odd number, the first OVSF codes and the second OVSF codes are mapped according to $F7(C_{data,128,2n+1})=F7(C_{data,128,2(n+8)+1})=F7(C_{data,128,2(n+16)+1})=C_{control,256,103-n}$, (for $0 \leq n \leq 7$) and $F7(C_{data,128,64+2n+1})=F7(C_{data,128,64+2(n+8)+1})=F7(C_{data,128,64+2(n+16)+1})=C_{control,256,207-n}$, (for $0 \leq n \leq 7$), where a spreading factor of the data signal is SF=128, a spreading factor of the control signal is SF=256, and k=0, 1, 2, 3, . . . , 23.

11. A channel allocation method in a CDMA (Code Division Multiple Access) communication system, comprising the steps of:

selecting a node among a plurality of nodes having a SF (Spreading Factor) supportable for a maximum data rate in the CDMA communication system;

allocating codes corresponding to child nodes having the selected node as a mother node to a control channel; and allocating codes corresponding to non-selected nodes and codes corresponding to child nodes having the non-selected nodes as a mother node to a data channel corresponding to the control channel, wherein the codes allocated to a plurality of control channels maintain orthogonality with each other, and the codes allocated to a plurality of data channels are also orthogonal with each other.

12. A channel transmission method for a user equipment (UB) in a CDMA (Code Division Multiple Access) communication system, comprising the steps of:

receiving a node having a specific SF (Spreading Factor) allocated from a UTRAN (UMTS (Universal Mobile Terrestrial System) Terrestrial Radio Access Network);

selecting a node among at least one node having an identical SF as the received node;

allocating a child node among a plurality of child nodes having the selected node as a mother node to a control channel;

allocating a node among the received node and child nodes having the received node as a mother node to a data channel corresponding to the control channel;

spreading a control signal with a code corresponding to the node allocated to the control channel; and spreading a data signal with a code corresponding to the node allocated to the data channel, wherein a code corresponding to the selected node maintains orthogonality with a code corresponding to the received node.

13. A channel transmission apparatus for a user equipment (UE) in a CDMA (Code Division Multiple Access) communication system, comprising:

an input unit for receiving a node having a specific SF (Spreacting Factor) allocated from a UTRAN (UMTS (Universal Mobile Terrestrial System) Terrestrial Radio Access Network);

an OVSF (Orthogonal Variable Spreading Factor) code allocating device for selecting a node among one or more nodes having the same SF to the received node, allocating a code corresponding to anode among child nodes having the selected node as a mother node to a control channel, and allocating a code corresponding to a node among the received node and child nodes having the received node as a mother node to a data channel corresponding to the control channel;

an OVSF code generator for generating the code allocated to the control channel and the code allocated to the data channel;

a first spreader for spreading a control signal with the generated code for the control channel; and a second spreader for spreading a data signal with the generated code for the data channel, wherein a code corresponding to the selected node maintains orthogonality with a code corresponding to the received node.

14. A channel reception apparatus for a UTRAN(UMTS (Universal Mobile Terrestrial System) Terrestrial Radio Access Network) in a CDMA (Code Division Multiple Access) communication system, comprising:

a memory for storing nodes arranged in a tree form for each SF (Spreading Factor);

an OVSF (Orthogonal Variable Spreading Factor) code allocating device for acquiring a node among at least one node having an identical SF to a random node allocated to a specific UE, allocating a node among child nodes having the acquired node as a mother node to a control channel, and allocating a node among a random node and child nodes having the random node as a mother node to the data channel corresponding to the control channel;

an OVSF code generator for generating a first code corresponding to the node allocated to the control channel and a second code corresponding to the node allocated to the data channel;

a first despreader for despreading a control signal received from the specific UE with the first code; and a second despreader for despreading a data signal received from the specific UE with the second code, wherein a code corresponding to the acquired node maintains orthogonality with a code corresponding to the reccived node.

* * * * *